(12) United States Patent
Matsumoto et al.

(10) Patent No.: US 8,616,078 B2
(45) Date of Patent: Dec. 31, 2013

(54) MULTISTAGE TRANSMISSION

(75) Inventors: Shinya Matsumoto, Wako (JP); Jun Miyazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 13/382,082

(22) PCT Filed: Jul. 30, 2010

(86) PCT No.: PCT/JP2010/062882
§ 371 (c)(1),
(2), (4) Date: Mar. 6, 2012

(87) PCT Pub. No.: WO2011/016396
PCT Pub. Date: Feb. 10, 2011

(65) Prior Publication Data
US 2012/0152046 A1  Jun. 21, 2012

(30) Foreign Application Priority Data
Aug. 3, 2009  (JP) .................................. 2009-180890

(51) Int. Cl.
*F16H 3/08* (2006.01)
*F16D 11/06* (2006.01)
*F16D 13/14* (2006.01)

(52) U.S. Cl.
USPC ............................................ 74/333; 192/76

(58) Field of Classification Search
USPC ................ 74/329, 333, 334, 335, 337.5, 409; 192/76, 93
See application file for complete search history.

(56) References Cited

U.S. PATENT DOCUMENTS

| 1,102,427 | A | * | 7/1914 | Morgan | 74/372 |
| 3,889,547 | A | * | 6/1975 | Sun et al. | 74/336 R |
| 5,570,608 | A | * | 11/1996 | Miller | 74/325 |
| 5,689,998 | A | * | 11/1997 | Lee | 74/371 |
| 6,698,303 | B2 | * | 3/2004 | Hoffmann et al. | 74/337.5 |
| 6,978,692 | B2 | * | 12/2005 | Thery | 74/372 |
| 7,484,605 | B2 | * | 2/2009 | Pawley et al. | 192/43.1 |
| 7,882,758 | B2 | * | 2/2011 | Kubo et al. | 74/372 |
| 8,042,421 | B2 | * | 10/2011 | Matsumoto | 74/337.5 |

(Continued)

FOREIGN PATENT DOCUMENTS

| JP | 50-74650 U | 6/1975 |
| JP | 54-108169 A | 8/1979 |
| JP | 58-88043 U | 6/1983 |
| JP | 2010-78051 A | 4/2010 |

*Primary Examiner* — Troy Chambers
*Assistant Examiner* — Michael Gonzalez
(74) *Attorney, Agent, or Firm* — Birch, Stewart, Kolasch & Birch, LLP

(57) ABSTRACT

A gear with an annular member disposed alongside a side wall of an inward protrusion in a manner turnable relative to the side wall. The annular member is formed with abutment projections with inclined surfaces extending in circumferential directions and engaged by engaging pawls. The annular member is urged by return springs in such a manner that the portion of each abutment projection, at least other than the inclined surfaces, overlaps each engaging projection as viewed in axial direction. Each inclined surface of the abutment projection is made up of a bottom-side inclined surface having an inclination angle allowing abutment by the engaging pawls, and a top-side inclined surface having an inclination angle not allowing abutment by the engaging pawls but causing sliding movement of the engaging pawls. The engaging pawls are prevented be imposed with excessive local load when the engaging pawls engage the engaging projections of the gear.

20 Claims, 21 Drawing Sheets

(56) References Cited

U.S. PATENT DOCUMENTS

| | | | |
|---|---|---|---|
| 8,474,346 B2 * | 7/2013 | Matsumoto | 74/340 |
| 2010/0162841 A1 * | 7/2010 | Cavalerie | 74/335 |
| 2011/0000334 A1 * | 1/2011 | Matsumoto | 74/745 |
| 2011/0005343 A1 * | 1/2011 | Matsumoto | 74/325 |
| 2011/0011193 A1 * | 1/2011 | Matsumoto | 74/337.5 |
| 2011/0041636 A1 * | 2/2011 | Matsumoto | 74/337.5 |

* cited by examiner

← XXX

MULTISTAGE TRANSMISSION

TECHNICAL FIELD

This invention relates to a multistage transmission in which plural driving gears and plural driven gears are supported on mutually parallel gear shafts, respectively, in constantly meshing state for every speed.

BACKGROUND ART

In this constantly-meshing type multistage transmission, either of the driving gears or the driven gears are fixed to one gear shaft, the other are supported on the other gear shaft in a manner turnable relative to the other gear shaft, and speed shift is executed by selectively changing over the turnable gear, which is to be engaged with the other gear shaft via an engagement means.

A document (patent document 1) of the present applicant discloses a mechanism using a swingable lever operated by a cam member for the engagement of the turnable gear with a gear shaft.

PRIOR ART LITERATURE

Patent Literature

[Patent Literature 1] JP Patent Application No. 2008-246755

In the engagement means of the multistage transmission disclosed in the patent document 1, an engaging projection is formed on the inside peripheral surface of each turnable gear, and the swingable lever is supported on a pivot pin in the other gear shaft in such a manner that the tip end of the swingable lever can protrude radially outward and retreat radially inward. The tip end of the thus protruded swingable lever is adapted to be engaged with the engaging projection on the inside peripheral surface of the turnable gear, while the retreat of the tip end of the swingable lever releases the engagement of the tip end of the swingable lever with the engaging projection of the turnable gear.

SUMMARY OF THE INVENTION

Technical Problem

When the tip end of the swingable lever is to be engaged with the engaging projection on the inside peripheral surface of the turnable gear, the gear and the gear shaft are being relatively rotated, and the engaging action is made accompanied by collision of the tip end of the swingable lever against the engaging projection. When the tip end of the swingable lever collides against the engaging projection with a small amount of radial protrusion of the tip end, an excessive local load may be imposed to the tip end of the lever, so that it was necessary to make the tip end large-sized.

This invention is made in view of such a situation and its object is to provide a multistage transmission, which can avoid a situation of an excessive local load being imposed to the engaging tip end when the engaging lever of the engagement means is to be engaged with the engaging projection of the turnable gear.

Solution to Problem

To achieve the object, according to this invention, there is provided a multistage transmission in which a plurality of driving gears (m) and a plurality of driven gears (n) are supported on mutually parallel gear shafts in a constantly meshing state for every speed, one of the driving gears (m) and the driven gears (n) are fixed to one of the gear shaft, and engagement means is provided for each of the other gears, the engagement means being operative to cause an engaging projection (31) formed on an inside periphery of each of the other gears to engage a radially movable engaging member (R) provided on the other gear shaft (12) for each of the other gears, due to radially outward protrusion of the engaging member (R), in a manner to fix each of the other gears to the other gear shaft for speed shift: wherein the engaging projection (31) is formed on an annular inward protrusion (30C) on the inside periphery of each of the other gears (n); an annular plate member (35) is provided which is positioned close to, and turnably relative to a side surface of the inward protrusion (30C) having the engaging projection (31) of each of the other gears (n); and a return spring (38) is interposed between each of the other gears (n) and the annular plate member (35) to elastically maintain a predetermined relative position thereof; and wherein the annular plate member (35) is provided on an inside periphery thereof with an abutment projection (36) having inclined surfaces for abutment with the engaging member (R), said return spring (38) being operative to cause a portion of the abutment projection (36) at least other than the inclined surfaces to overlap the engaging projection (31) as viewd in an axial direction; and each of the inclined surfaces of the abutment projection (36) comprises a bottom-side inclined surface (36$pb$) having an inclination angle allowing engagement with the engaging member (R), and a top-side inclined surface (36$ps$) having an inclination angle which does not allow engagement with the engaging member (R) but allows sliding movement of the engaging member (R).

In a preferred embodiment of the invention, the engaging member (R) is swingable relative to the other gear shaft to cause an engaging pawl (Rp) thereof to radially outwardly protrude and radially inwardly retreat; and an angle ($\theta$) between the bottom-side inclined surface (36$pb$) and a straight line linking a contact point (Q), at which a tip end of the engaging pawl (Rp) contacts the bottom-side inclined surface (36$pb$) of the abutment projection (36), and a center (P) of swing of the engaging member (R), is set to an obtuse angle close to the right angle.

In a preferred embodiment of the invention, the angle ($\theta$) between the straight line (PQ) and the bottom-side inclined surface (36$pb$) is between 90 and 100 degrees.

In a preferred embodiment of the invention, a groove (31$v$) is formed at least in a base portion at one of two circumferential ends of the abutment projection (36), on a side at which the engaging member (Ra) for up-shift abuts.

In a preferred embodiment of the invention, an arcuate groove (32) is provided in a circumferential direction in a side surface of the inward protrusion (30C) with the engaging projection (31), of each of the other gears (n); and a circular arc-shaped cutout (37) in axial opposition to the arcuate groove (32) is formed on a surface of the annular plate member (35), axially opposing the inward protrusion (30C); and wherein the return spring (38) is inserted between the arcuate groove (32) and the circular arc-shaped cutout (37); and a clip (39) is fitted at a side of the annular plate member (35) opposite the side at which the annular plate member (35) faces the inward protrusion (30C) to prevent the annular plate member (35) from moving axially.

In a preferred embodiment of the invention, the abutment projection (36) of the annular plate member (35) has a circumferential width smaller than a circumferential spacing between the engaging pawl (Rp), in a protruding position, of the engaging member (Ra) for up-shift and the engaging pawl (Rp), in a protruding position, of the engaging member (Rb) for down-shift.

In a preferred embodiment of the invention, each of the other gears (n) is fitted turnably on adjoining bearing collars (13) fitted on the other gear shaft (12); and each of the bearing collars (13) has a circumferential shoulder (13d) formed by annularly cutting out an outside peripheral edge thereof facing the associated annular plate member (35), and the circumferential shoulder (13d) is fitted in an inner peripheral edge of each of the other gears (n) to support the same.

In a preferred embodiment of the invention, at least one (n6) of the other gears (n) having the smallest speed reduction rate among all the other gears (n) is provided with a friction structure for causing the annular plate member (35) to follow the movement of the one (n6) of the other gears under a predetermined friction, the friction structure being interposed between the annular plate member (35) and the one (n6) of the other gears, in place of the return spring (38).

In a preferred embodiment of the invention, the friction structure includes an annular waved spring (60) interposed between the annular plate member (35) and a side surface of the inward protrusion (30C) of the one (n6) of the other gears.

In a preferred embodiment of the invention, the friction structure includes a coned disc spring (70) interposed between the annular plate member (35) and a side surface of the inward protrusion (30C) of the one (n6) of the other gears.

Advantageous Effects of the Invention

According to the present invention, a portion of the abutment projection (36) at least other than the inclined surfaces is set, by the return spring (38), in position (centered) to be caused to overlap the engaging projection (31) as viewed in axial direction. Therefore, when the engaging member (R) is to make engagement, the engaging member is caused to abut the inclined surface of the abutment projection (36) of the annular plate member (35) before the engaging member engages the engaging projection (31) on the inward protrusion (30C) of the gear (n). Further, the inclined surface of the abutment projection (36) of the annular plate member (35) is made of a bottom-side inclined surface (36pb) having an inclination angle allowing engagement with the engaging member (R), and a top-side inclined surface (36ps) having an inclination angle which does not allow engagement with the engaging member (R) but allows sliding movement of the engaging member (R). Therefore, when the engaging member (R) in a largely protruded position abuts the bottom-side inclined surface (36pb) of the abutment projection (36), the engaging member (R), while abutting the inclined surface, causes the annular plate member (35) to turn against the force of the retun spring (38) and then engages the engaging projection (31) of the gear (n). On the other hand, when the engaging member (R) is in a protruded position to a small extent, the engaging member (R) abuts the top-side inclined surface (36ps) of the abutment projection (36) but in sliding contact with the same, and overrides the top-side inclined surface (36ps), whereby the engaging member (R) is prevented from being imposed with an excessive local load, and the engaging member (R) that has overridden the abutment projection (36) can abut the abutment projection (36) coming next in a largely protruded position.

Therefore, the engaging member (R) can engage the engaging projection (31) of the gear (n) without being imposed with an excessive local load thereto.

The angle (θ) between the bottom-side inclined surface (36pb) and a straight line linking a contact point (Q), at which a tip end of the engaging pawl (Rp) contacts the bottom-side inclined surface (36pb) of the abutment projection (36), and a center (P) of swing of the engaging member (R), is set to an obtuse angle close to the right angle. Consequently, even when the plural engaging members (R) do not abut concurrently the related bottom-side inclined surfaces (36pb) of the abutment projections (36), respectively, at precise positions, the engaging members (R) are allowed to swing successively to make engagement with the engaging projections (31), whereby a situation in which some of the engaging projections (31) are unanble to engage the engaging projections (31) can be avoided.

Since the angle (θ) between the straight line (PQ) and the bottom-side inclined surface (36pb) is between 90 and 100 degrees, the engaging members (R) are ensured to abut the bottom-side inclined surfaces (36pb) of the abutment projections (36) without relative slip, and a situation in which some of the engaging projections (31) are unable to engage the engaging projections (31) can be avoided.

The groove (31v) is formed at least in a base portion at one of two circumferential ends of the abutment projection (36), on a side at which the engaging member (Ra) for up-shift abuts. This groove (31v) serves to prevent stress concentration in the base portion of the engaging projections (31) and operates to disperse stresses to increase the strength of the engaging projections (31), in case the engaging members (R) move to engage the engaging surfaces of the engaging projections (31).

The return spring (38) is inserted between the arcuate groove (32) of the gear (n) and the circular arc-shaped cutout (37) of the annular plate member (35), and a clip (39) is fitted at a side of the annular plate member (35) opposite the side at which the annular plate member (35) faces the inward protrusion (30C) to prevent the annular plate member (35) from moving axially. Due to this feature, a simple and compact structure can be provided to ensure circumferential positioning of the annular plate member (35) relative to the gear (n) via the return spring (38).

The abutment projection (36) of the annular plate member (35) has a circumferential width smaller than a circumferential spacing between the engaging pawl (Rp), in a protruding position, of the engaging member (Ra) for up-shift and the engaging pawl (Rp), in a protruding position, of the engaging member (Rb) for down-shift. Owing to this feature, the abutment projection (36) of the annular plate member (35) is positioned between the engaging member (Ra) for up-shift and the engaging member (Rb) for down-shift, whereby the abutment projection (36) is in a state capable of coping with both the up-shift and down-shift operations.

Each of the other gears (n) is fitted turnably on adjoining bearing collars (13) fitted on the other gear shaft (12); and each of the bearing collars (13) has a circumferential shoulder (13d) formed by annularly cutting out an outside peripheral edge thereof facing the associated annular plate member (35), and the circumferential shoulder (13d) is fitted in an inner peripheral edge of each of the other gears (n) to support the same. Owing to this feature, the axial thrust forces acting on each of the other gears (n) are borne by the circumferential shoulders (13d) of the bearing collars (13), whereby the spacing between each inward protrusion (30C) of the gears (n) and each bearing collar (13) can be maintained constant.

Therefore, the annular plate member (35) positioned close to the inward protrusion (30C) is prevented from being pressed by the bearing collar (13) to be urged against the inward protrusion (30C), whereby smooth turning of the annular plate member (35) relative to the gear (n) is not prevented. As a result, the engaging member (R) can be guided smoothly and is permitted to engage the engaging projection (31) of the gear (n) at a proper timing.

At least one (n6) of the other gears (n) having the smallest speed reduction rate among all the other gears (n) is provided with a friction structure for causing the annular plate member (35) to follow the movement of the one (n6) of the other gears under a predetermined friction, the friction structure being interposed between the annular plate member (35) and one (n6) of the other gears (n), in place of the return spring (38).

The one gear having the smallest speed reduction rate and operating effectively is not subjected to up-shift operation, so that it is not necessary for the annular plate member (35) to be moved to a center position by means of the return spring (38) and it is only required for the annular plate member (35) to follow the associated gear (n6) with a predetermined friction therebetween. Therefore, the simple friction structure is employed in place of the return spring (38). Thus the structure is simplified and machining and assembling work is improved with resultant reduction of the overall costs.

The friction structure includes an annular waved spring (60) interposed between the annular plate member (35) and a side surface of the inward protrusion (30C) of the one (n6) of the other gears. Thus the structure is simplified and machining and assembling work is improved with further reduction of the overall costs.

The friction structure includes a coned disc spring (70) interposed between the annular plate member (35) and a side surface of the inward protrusion (30C) of the one (n6) of the other gears. Thus the structure is simplified and machining and assembling work is improved with further reduction of the overall costs.

BRIEF DESCRIPTION OF THE DRAWINGS

FIG. 27 is an exploded view showing a driven transmission gear, an annular plate member, a waved spring and so on;

REFERENCE SIGN LIST m - - - Driving transmission gear,
m1 to m6 - - - First to sixth driving transmission gear,
n - - - Driven transmission gear,
n1 to n6 - - - First to sixth driven transmission gear,
10 - - - Multistage transmission,
11 - - - Main gear shaft,
12 - - - Counter gear shaft,
13 - - - Bearing collar,
20 - - - Engagement means,
22 - - - Compression spring, 23 --- Pin,
26 --- Pivot pin,
30L --- Left annular recess,
30R --- Right annular recess,
30C --- Annular protrusion,
31 --- Engaging projection,
31p --- Abutting surface,
31v --- Groove,
32 --- Circular arc-shaped groove,
33 --- Inside peripheral groove,
35 --- Annular plate member,
36 --- Abutment projection,
36pb --- Bottom-side inclined surface,
36ps --- Top-side inclined surface,
38 --- Coil spring,
39 --- Circlip,
C --- Cam rod,
R --- Swingable lever,
Rp --- Engaging pawl,
Rq --- Widened end,
51 --- Control rod,
60 --- Waved spring,
70 --- Coned disc spring

DESCRIPTION OF EMBODIMENTS

Referring to FIGS. 1 to 24, one embodiment of this invention will be described below.

A multistage transmission 10 according to this embodiment is built in an internal combustion engine mounted on a motorcycle.

Figure 1:
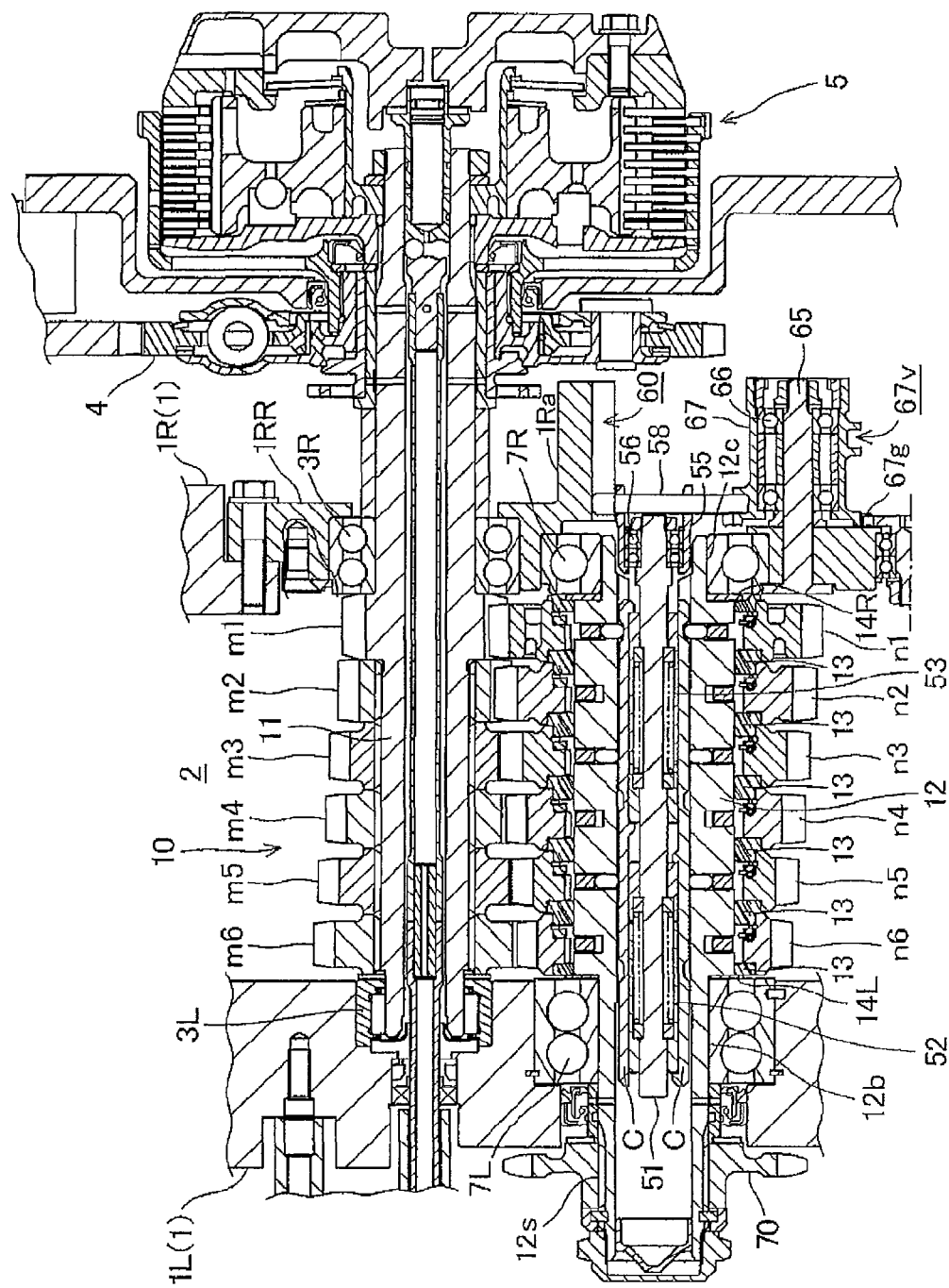
FIG. 1 is a sectional view showing a multistage transmission according to one embodiment of this invention.

FIG. 1 is a sectional view showing the multistage transmission 10 and as shown in FIG. 1, the multistage transmission 10 is disposed in an engine casing 1 for the internal combustion engine.

The engine casing 1 is of a divided construction and is made by uniting a left engine casing member 1L and a right engine casing member 1R. The engine casing 1 forms therein a transmission chamber 2 in which a main gear shaft 11 and a counter gear shaft 12 are supported so as to be oriented laterally and rotatably journalled in parallel disposition.

The main gear shaft 11 is rotatably journalled to a side wall of the left engine casing member 1L by a bearing 3L and a side wall 1RR of the right engine casing member 1R by a bearing 3R. The main gear shaft 11 extends through the right bearing 3R, and a multi-disc type friction clutch 5 is provided on its right end protruded from the transmission chamber 2.

A primary driven gear 4 to which the rotation of a crankshaft not shown is transmitted is rotatably supported on the main gear shaft 11 on the left side of the friction clutch 5.

The rotation of the crankshaft of the internal combustion engine is transmitted from the primary driven gear 4 to the main gear shaft 11 via the friction clutch 5 in engaged state The counter gear shaft 12 is also rotatably journalled to the side wall of the left engine casing 1L via a bearing 7L and to the side wall 1RR of the right engine casing 1R via a bearing 7R. The counter gear shaft 12 extends through the left bearing 7L, and an output sprocket 70 is fixed via splines to its left end protruded from the transmission chamber 2.

A driving chain wound around the output sprocket 70 is wound around a sprocket that drives a rear wheel of the motorcycle, not shown, disposed in the rear of the output sprocket, and the rotational power of the counter gear shaft 12 is transmitted to the rear wheel, whereby the motorcycle is made to run.

A group of driving transmission gears m are mounted on the main gear shaft 11 between the left and right bearings 3L and 3R so that the transmission gears m can be rotated integrally with the main gear shaft 11.

A first driving transmission gear m1 is integrally formed on the main gear shaft 11 adjacent to the right bearing 3R, and second, third, fourth, fifth and sixth driving transmission gears m2, m3, m4, m5 and m6. These driving transmission gears have diameters which are sequentially increased in the direction from the right to the left and are fitted to the main gear shaft 11 by splines formed between the first driving transmission gear m1 and the left bearing 3L.

A group of driven transmission gears n are turnably supported on the counter gear shaft 12 between the left and right bearings 7L and 7R via annular bearing collars 13, respectively.

The rightmost bearing collar 13 is fitted on the counter gear shaft 12 at the left side of the right bearing 7R with a washer 14R interposed therebetween, while the leftmost bearing collar 13 is fitted on the counter gear shaft 12 at the right side of the left bearing 7L with a washer 14L interposed therebetween. Between these rightmost and leftmost bearing collars 13 are fitted five bearing collars 13 at equal axial intervals. First, second, third, fourth, fifth and sixth driven transmission gears n1, n2, n3, n4, n5 and n6 are fitted on these seven bearing collars 13 in such a manner that each driven transmission gear straddles two adjoining bearing collars 13. The driven transmission gears have diameters sequentially decreasing in the direction from the right to the left.

The first, second, third, fourth, fifth and sixth driving transmission gears m1, m2, m3, m4, m5 and m6, which are turned together with the main gear shaft 11 are engaged constantly with the corresponding first, second, third, fourth, fifth and sixth driven transmission gears n1, n2, n3, n4, n5 and n6, respectively, which are turnably supported relative to the counter gear shaft 12.

The engagement of the first driving transmission gear m1 and the first driven transmission gear n1 constitutes a first speed having the largest speed reduction ratio, the engagement of the sixth driving transmission gear m6 and the sixth driven transmission gear n6 constitutes a sixth speed having the smallest speed reduction ratio. Second, third, fourth and fifth speeds are formed in this order between the first speed and the sixth speed, the speed reduction ratios of these second to fifth speeds are of sequentially decreased values.

On the counter gear shaft 12 are alternately arranged the gears for odd-number speeds (the first, third and fifth driven transmission gears n1, n3 and n5) and the gears for even-number speeds (the second, fourth and sixth driven transmission gears n2, n4 and n6).

Engagement means 20 engageable with each of the driven transmission gears n is built in the hollow cylindrical counter gear shaft 12 as will be described later. Each of the engagement means 20 includes as its component parts, as will be described later, a total of eight cam rods C of four types (Cao, Cao, Cae, Cae, Cbo, Cbo, Cbe and Cbe), each type including two cam rods. The cam rods C are fitted in cam guide grooves 12g (described later) formed in the internal peripheral surface of the hollow counter gear shaft 12 in such a manner that they are axially slidable in the cam guide grooves 12g.

There is provided a control rod 51 which is a component of shift driving means 50 that drives the cam rods C for speed shift. The control rod 51 is inserted along a central axis of the hollow counter gear shaft 12, and axial movement of the control rod 51 interlockingly causes axial movement of the cam rod C via lost motion mechanisms 52 and 53.

A mechanism that axially moves the control rod 51 is provided to the right engine casing member 1R.

The axial movement of the control rod 51 interlockingly causes axial movement of the cam rod C via the lost motion mechanism 52 and 53, and the movement of the cam rod C causes selective engagement of each driven transmission gear n with the counter gear shaft 12 for speed shift by means of the engagement means 20 built in the counter gear shaft 12.

Figure 6:
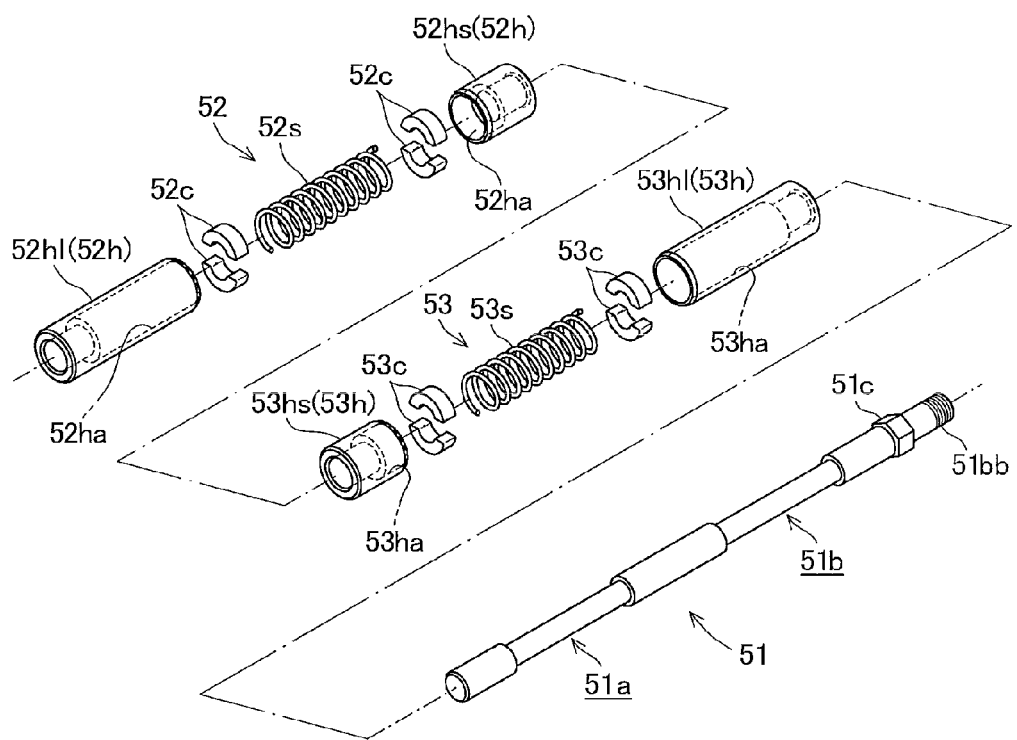
FIG. 6 is an exploded perspective view showing a control rod and lost motion mechanisms.

As shown in FIG. 6, the control rod 51 of the shift driving means 50 is a cylindrical rod and has peripheral recessed portions 51a and 51b formed by reducing its diameter in two, axially right and left areas having a predetermined length.

The right end of the control rod 51 is made a male screw end 51bb where a male screw is formed and a hexagonal nut 51c is provided at a location axially inside of the male screw end 51bb.

The lost motion mechanisms 52 and 53 are assembled on the left and right recessed portions 51a and 51b in the outer surface of the control rod 51.

The left and right lost motion mechanisms 52 and 53 have the same structure and are arranged symmetrically.

The left lost motion mechanism 52 has spring holders 52h in which the control rod 51 is slidably fitted. The spring holders 52h are configured by coupling a longer holder 52h1 and a shorter holder 52hs, and inside recessed portions 52ha corresponding to the outside recessed portion 51a of the control rod 51 are formed in their inside surfaces.

When the control rod 51 is made to be inserted into the spring holders 52h and the spring holders 52h are located outside the recessed portion 51a, both the spaces of the inside recessed portions 52ha of the spring holders 52h and the outside recessed portion 51a of the control rod 51 form a common space.

A pair of left and right cotters 52c for locating a spring therebetween are inserted at opposite positions in both the spaces of the inside recessed portions 52ha of the spring holders 52h and the outside recessed portion 51a of the control rod 51, and a compression coil spring 52s wound around the control rod 51 is inserted between both the cotters 52c, so that the compression coil spring presses the cotters 52c in directions away from each other.

Each cotter 52c is in the shape of an annular ring having an outer diameter equal to the inside diameter of the inside recessed portion 52ha of the spring holders 52h and having an inner diameter equal to the outside diameter of the outside recessed portion 51a of the control rod 51. Each cotter 52c is divided into halves for assembly.

The right lost motion mechanism 53 (a spring holders 53h, a longer holder 53h1, a shorter holder 53hs, an inside recessed portions 53ha, cotters 53c, a compression coil spring 53s) also has the same structure and is arranged in the outside recessed portion 51b of the control rod 51.

Accordingly, when the control rod 51 is axially moved, the spring holders 52h and 53h are axially moved via the compression coil springs 52s and 53s of the left and right lost motion mechanisms 52 and 53.

Figure 7:
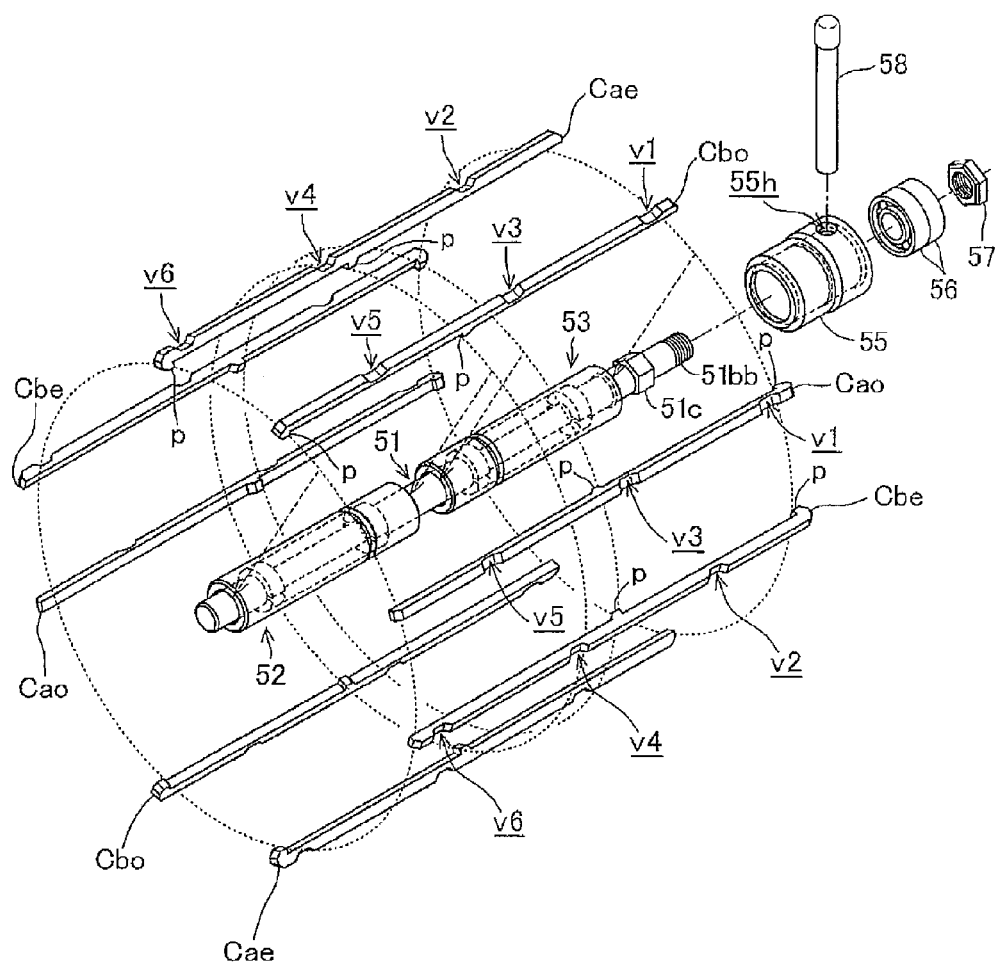
FIG. 7 is an exploded perspective view showing a state in which the lost motion mechanisms are mounted on the control rod and showing cam rods and others.

The eight cam rods C (Cao, Cao, Cae, Cae, Cbo, Cbo, Cbe and Cbe) are in contact with radially outer surfaces of the spring holders 52h and 53h of the lost motion mechanisms 52 and 53 mounted in the left and right outside recessed portions 51a and 51b of the control rod 51 (see FIG. 7).

Each of the cam rods C is an axially elongated prism the cross section of which is rectangular, and the radially outer side of each cam rod, reverse to the radially inner side touching the spring holder 52h and 53h, forms a cam surface. Cam grooves v are formed at predetermined three locations in the cam surface; and each cam rod C has a pair of engaging pawls p protruding from the radially inner side for engaging either of the spring holders 52h and 53h with the cam rod held between the pair of engaging pawls.

As the cross-section of the cam rod C is not in a special shape and the overall shape thereof is a simple rectangular prism, the cam rod C can be easily manufactured.

The odd-number cam rods Cao and Cbo, in which the cam grooves v1, v3 and v5 are respectively formed at three locations corresponding to the odd-number gears (the first, third and fifth driven transmission gears n1, n3 and n5), are in two types including a type for normal rotation (a rotational direction in which force is applied from the driven transmission gear n to the driven gear shaft in acceleration) and a type for reverse rotation (a rotational direction in which force is applied from the driven transmission gear n to the driven gear shaft in deceleration). One cam rod Cao for normal rotation and odd-number speed is provided with the engaging pawls p for engaging the right spring holder 53h on its radially inner side, and the other cam rod Cbo for reverse rotation and odd-number speed is provided with the engaging pawls p for engaging the left spring holder 52h on its radially inner side (see FIG. 7).

Similarly, the cam rods Cae and Cbe for even-number speeds in which the cam grooves v2, v4 and v6 are formed at the three locations corresponding to the gears for even-number speeds (the second, fourth and sixth driven transmission gears n2, n4 and n6) are in two types including a type for normal rotation and a type for reverse rotation. One cam rod Cae for normal rotation and even-number speed is provided with the engaging pawls p for engaging the left spring holder 52h on its radially inner side and the other cam rod Cbe for reverse rotation and even-number speed is provided with the engaging pawls p for engaging the right spring holder 53h on its radially inner side (see FIG. 7).

Accordingly, the cam rod Cao for normal rotation and odd-number speed and the cam rod Cbe for reverse rotation and even-number speed are axially moved with the axial movement of the control rod 51 together with the spring holder 53h via the compression coil spring 53s of the right lost motion mechanism 53, and the cam rod Cbo for reverse rotation and odd-number speed and the cam rod Cae for normal rotation and even-number speed are axially moved with the axial movement of the control rod 51 together with the spring holder 52h via the coil spring 52s of the left lost motion mechanism 52.

As shown in FIG. 7, a control rod operating cylinder 55 is attached to the right end on the right side of the nut 51c of the control rod 51 via a ball bearing 56 fitted in the operating cylinder 55.

The ball bearing 56 is made up of two ball bearing elements which are axially coupled and are fitted on the right end of the control rod 51 at the right side of the nut 51c. The ball bearing 56 is fastened by a nut 57 screwed on the male screw end 51bb with the ball bearing held between the nut 51c and the nut 57.

Accordingly, the control rod operating cylinder 55 rotatably holds the right end of the control rod 51.

A pin hole 55h in a diametrical direction is formed in a cylindrical part extending to the right side of the screwed nut 57 of the control rod operating cylinder 55, and a shift pin 58 is passed through the pin hole 55h.

Both ends of the shift pin 58 passed through the control rod operating cylinder 55 project outward as shown in FIG. 1.

A groove 60 is formed in left to right direction in a guide part 1Ra protruding rightward from the side wall 1RR of the right engine casing member 1R, and a head at one end of the shift pin 58 is slidably fitted in the groove 60 so as to prevent the shift pin 58 from being turned.

A spindle 65 is protruded rightward from the side wall 1RR, a shift drum 67 is turnably supported on the spindle 65 via a bearing 66, and the other protruded end of the shift pin 58 is slidably fitted in a shift groove 67v of the shift drum 67.

The shift groove 67v of the shift drum 67 is formed spirally substantially and has a turn around the outer surface of the drum, and the shift groove has therein positions corresponding to different speeds including the first to the sixth speed and a neutral position at intervals of a predetermined turning angle (for example, 60 degrees).

Accordingly, the turning of the shift drum 67 causes axial movement of the shift pin 58 fitted in the shift groove 67v together with the control rod operating cylinder 55.

As the control rod operating cylinder 55 rotatably holds the right end of the control rod 51, the turning of the shift drum 67 finally moves the control rod 51 axially.

The shift drum 67 is turned via shift transmission means (not shown) by manual operation of a shift select lever not shown.

The shift transmission means is provided with a mechanism such as a shift cam for stably holding the shift drum 67 at positions of the different speeds at intervals of the predetermined angle, transmits power produced by operating the shift select lever to a gear 67g formed at a side edge of the shift drum 67, and sequentially turns the shift drum 67 to desired positions of different speeds.

As described above, in the shift driving means 50, the shift drum 67 is turned by manual operation of the shift select lever, the turning of the shift drum 67 guides and axially moves the shift pin 58 fitted in the shift groove 67v, the movement of the shift pin 58 axially moves the control rod 51 via the control rod operating cylinder 55, and the eight cam rods Cao, Cao, Cae, Cae, Cbo, Cbo, Cbe and Cbe of the engagement means 20 are made to slide via the lost motion mechanisms 52 and 53 by the movement of the control rod 51.

The control rod 51 on which the lost motion mechanisms 52 and 53 are mounted is inserted in the hollow interior of the counter gear shaft 12 and is arranged along the central axis thereof.

The hollow cylindrical counter gear shaft 12 has an inside diameter substantially equal to the outside diameter of each of the spring holders 52h and 53h of the lost motion mechanisms 52 and 53, and the spring holders 52h and 53h mounted on the control rod 51 are slidably fitted in the cylindrical counter gear shaft 12.

Figure 9:
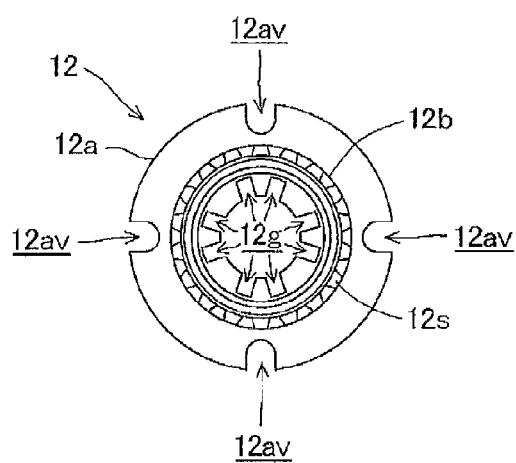
FIG. 9 is a left side view showing the counter gear shaft (as viewed in the direction shown by the arrow IX in FIG. 8)

Eight cam guide grooves 12g each having a rectangular cross section are axially extended in eight radial positions in the internal peripheral surface of the hollow counter gear shaft 12 (see FIG. 9). The eight cam rods Cao, Cao, Cae, Cae, Cbo, Cbo, Cbe and Cbe are slidably fitted in corresponding cam guide grooves 12g in the arrangement shown in FIG. 7. The cam rods C of the same type are arranged in symmetrical positions.

The cross section of the cam guide grooves 12g that function to prevent rotation of the cam rods C relative to the counter gear shaft 12 are simply U-shaped so that they can be easily worked.

The depth of the cam guide grooves 12g is equal to the width in the radial direction of the cam rods C. Therefore, the cam surfaces which are the outer surfaces of the cam rods C are in slidable contact with the bottoms of the cam guide grooves 12g, the inner surfaces of the cam rods C are in contact with the outer peripheries of the spring holders 52h and 53h substantially along the internal peripheral surface of the hollow counter gear shaft, and the engaging pawls P protruding from the inner side of each of the cam rods grasp and hold either the spring holder 52h or 53h at both sides thereof.

Figure 8:
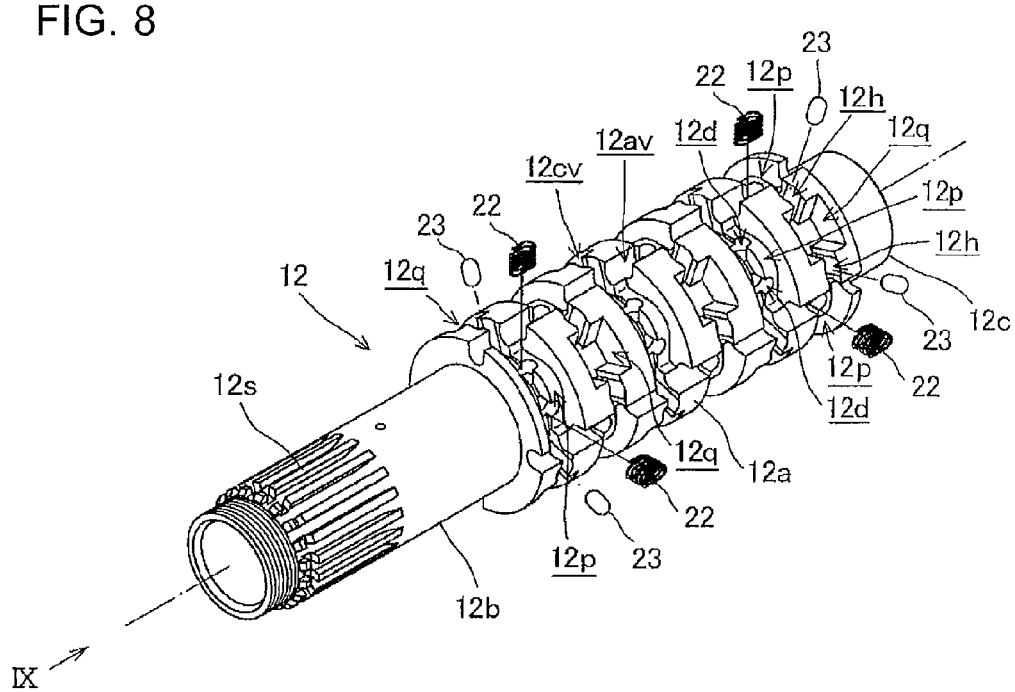
FIG. 8 is an exploded perspective view showing the counter gear shaft, pins and springs.

A left cylindrical part 12b of reduced outside diameter and a right cylindrical part 12c of reduced outside diameter are formed on both left and right sides of the central cylindrical part 12a of the hollow cylindrical counter gear shaft 12, and on the central cylindrical part 12a are supported the driven transmission gears n via the bearing collars 13 (see FIG. 8).

The left cylindrical part 12b is supported by the bearing 7L with the washer 14L disposed adjacent to the bearing 7L, splines 12s are partially formed and the output sprocket 70 is fitted to the splines. The bearing 7R supports the right cylindrical part 12c with the washer 14R disposed adjacent to the bearing 7R (see FIGS. 1, 2 and 3).

The hollow part of the counter gear shaft 12 has a smaller-diameter internal peripheral surface in which the cam guide grooves 12g are formed and which extends along the radially outer surfaces of the spring holders 52h and 53h. The hollow part of the counter gear shaft 12 has also a larger-diameter internal peripheral surface which is formed by the bottoms of the cam guide grooves 12g (see FIGS. 2 and 3).

The control rod operating cylinder 55 is fitted approximately a half way into the right end part of the larger-diameter internal peripheral surface.

In the state in which the control rod 51, the lost motion mechanisms 52 and 53 and the eight cam rods Cao, Cao, Cae, Cae, Cbo, Cbo, Cbe and Cbe are build in the hollow interior of the counter gear shaft 12 as described above, all these elements are turned together. When the control rod 51 is axially moved, the cam rod Cbo for reverse rotation and odd-number speed and the cam rod Cae for normal rotation and even-number speed are axially moved via the coil spring 52s of the left lost motion mechanism 52, while the cam rod Cao for normal rotation and odd-number speed and the cam rod Cbe for reverse rotation and even-number speed are axially moved via the coil spring 53s of the right lost motion mechanism 53.

As the lost motion mechanisms 52 and 53 are arranged in side-by-side positions in the axial direction of the counter gear shaft 12 and are interposed between the outside surface of the control rod 51 and the inside surfaces of the plural cam rods C, axial increase of the size of the multistage transmission 10 is prevented because of the structure where the control rod 51, the lost motion mechanisms 52 and 53 and the cam rods C are overlapped in the diametrical directions within the hollow interior of the counter gear shaft 12, whereby the lost motion mechanisms 52 and 53 are compactly housed in the hollow interior of the counter gear shaft 12, and the multistage transmission 10 itself can be miniaturized.

As the two lost motion mechanisms 52 and 53 are disposed in axial alignment on the control rod 51 and the lost motion mechanisms 52 and 53 are interlocked with the separate cam rods C, respectively, the movement of one control rod 51 separately moves the plural cam rods C of two different types of movement, whereby speed shift can be smoothed. Further, the manufacturing cost can be reduced by making the lost motion mechanisms 52 and 53 in symmetrical structure, and the management of parts in assembly is facilitated.

As for the lost motion mechanisms 52 and 53, the coil spring 52s and 53a are inserted in the spaces which are defined by the inside recessed portion 52ha and 53ha of the spring holders 52h and 53h, fitted between the outside surface of the control rod 51 and the inside surfaces of the plural cam rods C, and by the peripheral recessed portions 51a and 52b of the control rod 51, the lost motion mechanisms 52 and 53 having the same shape can be assembled on the control rod 51.

As shown in FIG. 8, the outer diameter of the central cylindrical part 12a on which the driven transmission gears n are supported via the bearing collars 13 of the counter gear shaft 12 is made large, and the central cylindrical part 12a is made radially thick. In this thick part are formed six narrow circumferential grooves 12cv extending in circumferential directions at equal axial intervals at positions corresponding to the first, second, third, fourth, fifth and sixth driven transmission gears n1, n2, n3, n4, n5 and n6, as well as four axial grooves 12av at equal circumferential intervals.

Further, the outer surface of the central cylindrical part 12a of the counter gear shaft 12 is formed therein with longer rectangular recessed portions 12p and shorter rectangular recessed portion 12q. These longer and shorter rectangular recessed portions are formed alternately in the axial direction of the central cylindrical part 12a. Each of the six narrow circumferential grooves 12cv are divided by the four axial grooves 12av into four sections of the circumferential grooves 12cv. The axial width of each section of the circumferential grooves 12cv is widened parly in the circumferential direction. In some of the circumferential grooves 12cv, the opposite side walls of the grooves are cut out in equal depth to a longer circumferential extent to provide the longer rectangular recessed portions 12p, while in the rest of the circumferential grooves 12cv, the opposite side walls of the grooves are cut out in equal depth to a shorter circumferential extent to provide the shorter rectangular recessed portions 12q. These longer and shorter rectangular recessed portions 12p and 12q are arranged in axially alternate disposition.

Spring bearing portions 12d are formed in two locations circumferentially apart at the bottom of the longer rectangular recessed portion 12p. The spring bearing portions 12d are in the shape of an axially elongate ellipse and slightly recessed along the circumferential groove 12cv Besides, pin holes 12h are diametrically bored to the cam guide grooves 12g at positions in the circumferential grooves 12cv and through the thick wall parts located between the shorter rectangular recessed portions 12q and the axial grooves 12av.

That is, the pin holes 12h are bored in radial directions of the cam guide grooves 12g at four circumferentially spaced locations to the internal peripheral surface of the hollow counter gear shaft 12.

Four pin holes 12h are formed for each circumferential groove 12cv.

A compression spring 22 in the form of an elliptical coil spring is provided with its inner end fitted in each of the spring bearing portions 12d.

A pin 23 is slidably fitted into each of the pin hole 12h.

The width of each of the cam guide grooves 12g with which the pin holes 12h communicate is smaller than the outside diameter of the pin 23.

Accordingly, each pin 23 that advances and retreats in the pin hole 12h is prevented from falling in the cam guide groove 12g, whereby the engagement means 20 can be easily mounted around the counter gear shaft 12.

As the cam rods C are slidably fitted into the cam guide grooves 12g, the radially inner end of each pin 23 inserted into each pin hole 12h touches the cam surface of the corresponding cam rod C. When each of the cam grooves v moves to a position of the related pin hole 12h by the movement of the cam rod C, the pin 23 falls into the cam groove v. When the sliding surface other than the cam grooves v is opposing the pin 23, the pin rides on the sliding surface. Thus, the pin advances and retreats depending upon the movement of the cam rod C.

The advance and the retreat of the pin 23 within the pin hole 12h cause the radially outer end of the pin to project outward of and retreat inward of the bottom of the circumferential groove 12cv.

Swingable levers R are disposed in the longer rectangular recessed portions 12p, the shorter rectangular recessed portions 12q and the circumferential grooves 12cv that communicate with both the recessed portions, these portions and grooves being formed in the outer surface of the central cylindrical part 12a of the counter gear shaft 12. Pivot pins 26 which swingably support the swingable levers R, respectively, are fitted in the axial grooves 12av.

Figure 11:
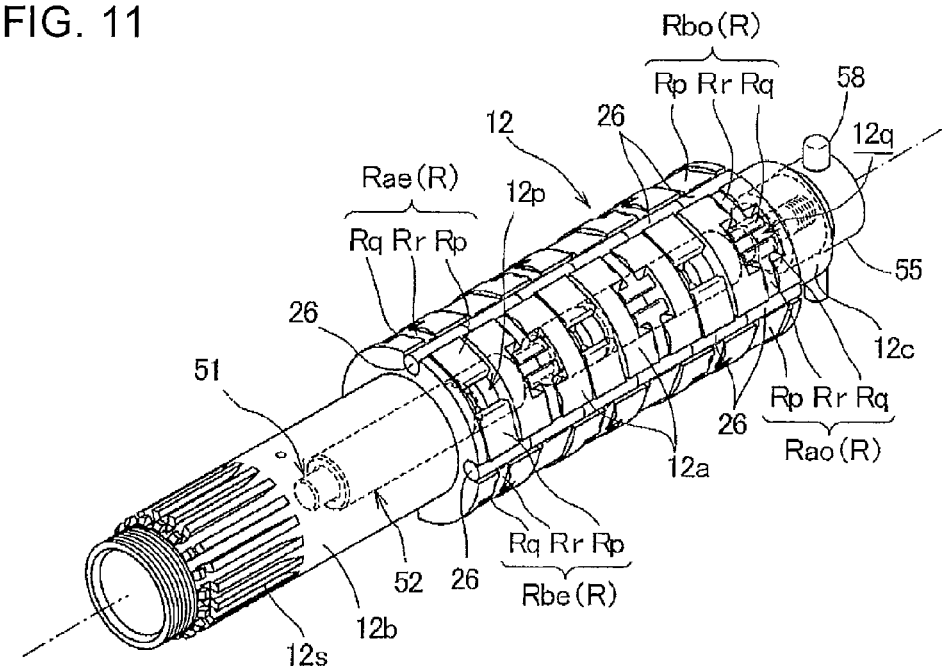
FIG. 11 is a perspective view showing a state in which a part of shift driving means and engagement means are assembled on the control rod.

FIG. 11 shows a state in which all the swingable levers R are assembled as described above.

Figure 10:
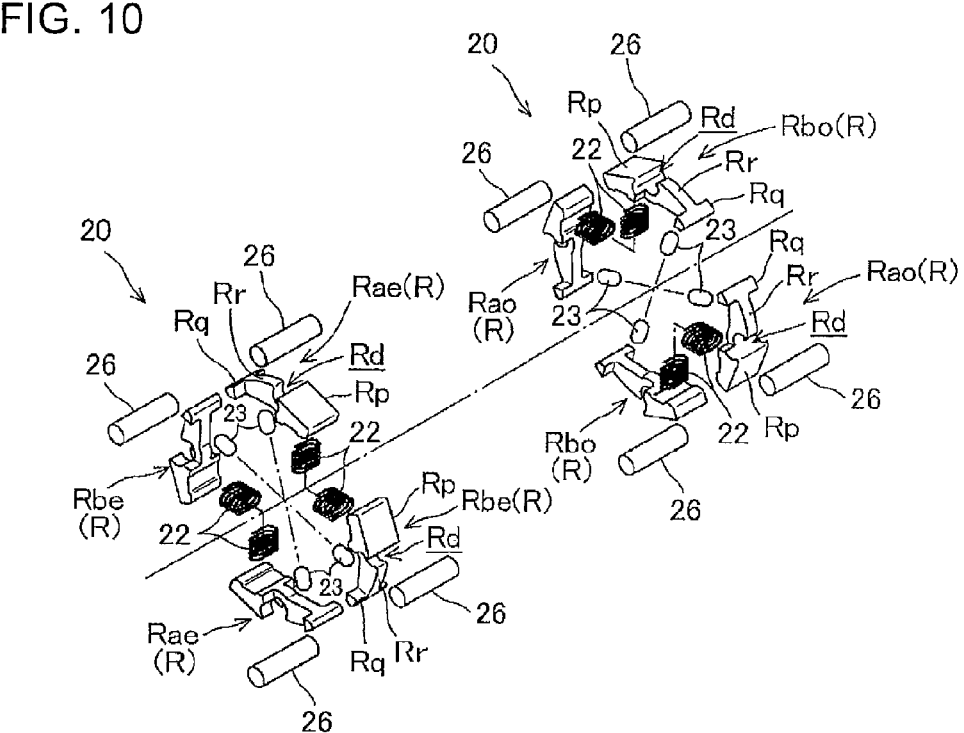
FIG. 10 is an exploded perspective view showing swingable pawls, pivot pins, the pins and the springs.

The exploded perspective view of FIG. 10 shows four swingable levers R put in the circumferential grooves 12cv, the longer rectangular recessed portions 12p and the shorter rectangular recessed portions 12q associated with the odd-number gears (the first, third and fifth driven transmission gears n1, n3 and n5), as well as four swingable levers R put in the circumferential grooves 12cv, the longer rectangular recessed portions 12p and the shorter rectangular recessed portions 12q associated with the even-number gears (the SECOND, fourth and sixth driven transmission gears n2, n4 and n6), the view showing relative angular positions of the above members. This view also shows the pivot pins 26 that support the swingable levers R, the compression springs 22 that act on the swingable levers R and the pins 23.

All the swingable levers R have the same shape and are substantially in the shape of a circular arc as viewed in the axial direction. The radially outer edge of the central portion of each swingable lever R is cut out to provide a bearing recessed portion Rd which serves as a partly cut-out through hole for receiving the pivot pin 26. A widened rectangular engaging pawl Rp is formed on one side of the bearing recessed portion Rd in the center, a narrowed pin abutting part Rr is extended on the other side. A widened end Rq is formed at the end of the pin abutting part Rr.

The pin abutting part Rr of the swingable lever R is fitted in the area of the circumferential groove 12cv in which the pin hole 12h is formed. The engaging pawl Rp is fitted in the longer rectangular recessed portion 12p, the bearing recessed portion Rd is placed at a position matching the axial groove 12av, and the widened end Rq is fitted in the shorter rectangular recessed portion 12q.

The pivot pin 26 is fitted in the bearing recessed portion Rd and axial groove 12av, which are in axial alignment.

The swingable lever R extends from its center substantially equally in opposite directions within the circumferential groove 12cv in which the lever R is fitted, and the widened rectangular engaging pawl Rp is heavier than the other pin abutting part Rr and the widened end Rq. When the swingable lever R is turned together with the counter gear shaft 12 with the swingable lever supported by the pivot pin 26, the engaging pawl Rp acts as a weight under the centrifugal force, and the engaging pawl Rp causes the swingable lever R to swing so that the swingable pawl will move in a radially outer direction.

The swingable lever R is formed such that the width of the pin abutting part Rr is narrower than that of the engaging pawl Rp which is on the opposite side in relation to the center of the swing motion.

As the pin abutting part Rr may only have a width enough to be abutted by the pin 23, the swingable lever R can be miniaturized, and the swing motion under the centrifugal force by the opposite engaging pawl Rp can be facilitated.

Circumferentially adjacent swingable levers R are mounted on the counter gear shaft 12 in mutually symmetrical attitudes, whereby the engaging pawls Rp of adjacent swingable levers R are put in mutually opposing positions at a predetermined interval within a common longer rectangular recessed portion 12p, while the mutually adjacent widened ends Rq of circumferentially adjacent swingable levers R are put within a common shorter rectangular recessed portion 12q.

Each compression spring 22 having one end received in the spring bearing portion 12d of the counter gear shaft 12 is placed to have the other end abutting the radially inner surface of the engaging pawl Rp of the swingable lever R, while each pin 23 fitted in the pin hole 12h is placed between the related cam rod C and the related pin abutting part Rr.

As described above, the swingable lever R is swingably supported by the pivot pin 26, and is fitted in the longer rectangular recessed portion 12p, the shorter rectangular recessed portion 12q and the circumferential groove 12cv of the counter gear shaft 12, in such a manner that the engaging pawl Rp at one end is urged outward by the compression spring 22 and the pin abutting part Rr at the opposite end is acted upon by the advance and the retreat of the pin 23. Therefore, the swingable lever R is operated to swing under the force of the compression spring 22 and the centrifugal force acting on the engaging pawl Rp.

When the pin 23 advances in the centrifugal direction and swings the swingable lever R, the engaging pawl Rp sinks into the longer rectangular recessed portion 12p in the swingable lever R and nothing is protruded radially outward from the outside peripheral surface of the central cylindrical part 12a of the counter gear shaft 12.

When the pin 23 retreats, the engaging pawl Rp which is urged by the compression spring 22 and on which the centrifugal force is acting is protruded radially outward from the outside peripheral surface of the central cylindrical part 12a of the counter gear shaft 12 and can be engaged with the driven transmission gear n.

As the compression spring 22 is interposed between the inside surface of the engaging pawl Rp of the swingable lever R and the opposite longer rectangular recessed portion 12p of the counter gear shaft 12, a axial space solely for the spring is not required, the counter gear shaft 12 is prevented from being axially large-sized. Further, the compression spring 22 can be arranged in the middle of the axial width of the swingable lever R and opposite axial sides of the swingable lever R can be made symmetrical. Therefore, two types of swingable levers, which make engagement and disengagement in two opposite relative rotational directions between the driven transmission gear n and the counter gear shaft 12, can have the same shape, whereby it is not required to prepare swingable levers different in shape.

The compression spring 22 is in the shape of an ellipse having a longer diameter along the axis of the counter gear shaft 12, the longer diameter of the elliptic compression spring 22 is larger than the width of the pin abutting part Rr of the swingable lever R so that the compression spring is held over the full width of the circumferential groove 12cv into which the pin abutting part Rr is fitted, the machining of the counter gear shaft 12 is facilitated and the swingable lever R can be stably assembled on the counter gear shaft 12.

The four swingable lever R for the odd-number gears (the first, third and fifth driven transmission gears n1, n3, n5) and the four swingable lever R for the even-number gears (the second, fourth and sixth driven transmission gears n2, n4, n6) are arranged in such a relative angular positional relation in which they are mutually angularly displaced by 90 degrees with respect to the center axis of the shaft.

The four swingable levers R for the odd-number gears (the first, third and fifth driven transmission gears n1, n3 and n5) include: a first pair of swingable levers Rao for normal rotation and odd-number speeds, which engage each of the odd-number driven transmission gears n1, n3 and n5 in the direction of the normal rotation of the gears to cause each of the odd-number driven transmission gears n1, n3 and n5 and the counter gear shaft 12 to be rotated synchronously; and a second pair of swingable levers Rbo for reverse rotation and odd-number speeds, which engage each of the odd-number driven transmission gear n1, n3 and n5 in the direction of the reverse rotation of the gears to cause each of the odd-number driven transmission gear n1, n3 and n5 and the counter gear shaft 12 to be rotated synchronously. The swingable levers of each pair are arranged in diametrically symmetrical positions.

Similarly, the four swingable levers R for the even-number gears (the second, fourth and sixth driven transmission gears n2, n4 and n6) include: a first pair of swingable levers Rae for normal rotation and even-number speeds, which engage each of the even-number driven transmission gears n2, n4 and n6 in the direction of the normal rotation of the gears to cause each of the even-number driven transmission gears n2, n4 and n6 and the counter gear shaft 12 to be rotated synchronously; and a second pair of swingable levers Rbe for reverse rotation and even-number speeds, which engage each of the even-number driven transmission gear n2, n4 and n6 in the direction of the reverse rotation of the gears to cause each of the even-number driven transmission gear n2, n4 and n6 and the counter gear shaft 12 to be rotated synchronously. The swingable levers of each pair are arranged in diametrically symmetrical positions.

The swingable lever Rao for normal rotation and odd-number speed is swung by the pin 23 that advances and retreats by the movement of the cam rod Cao for normal rotation and odd-numbered speed, and the swingable lever Rbo for reverse rotation and odd-number speed is swung by the pin 23 that advances and retreats by the movement of the cam rod Cbo for reverse rotation and odd-number speed.

Similarly, the swingable lever Rae for normal rotation and even-number speed is swung by the pin 23 that advances and retreats by the movement of the cam rod Cae for normal rotation and even-number speed, and the swingable lever Rbe for reverse rotation and even-number speed is swung by the pin 23 that advances and retreats by the movement of the cam rod Cbe for reverse rotation and even-number speed.

When the engagement means 20 is to be built in the counter gear shaft 12, the bearing collar 13 at the right end is first fitted at the end part of the outside surface of the central cylindrical part 12a, one end of the pivot pin 26 is fitted into the part of the axial groove 12av axially inward of the bearing collar 13, the rightmost engagement means 20 is assembled in position, then the next bearing collar 13 is fitted, the next engagement means 20 is built in as described above, the same procedures are repeated sequentially, the last engagement means is built in after the next bearing collar 13 is fitted to cover the left end of the pivot pin 26, and the last bearing collar 13 at the left end is finally fitted. Thus, all the steps are finished.

Figure 12:
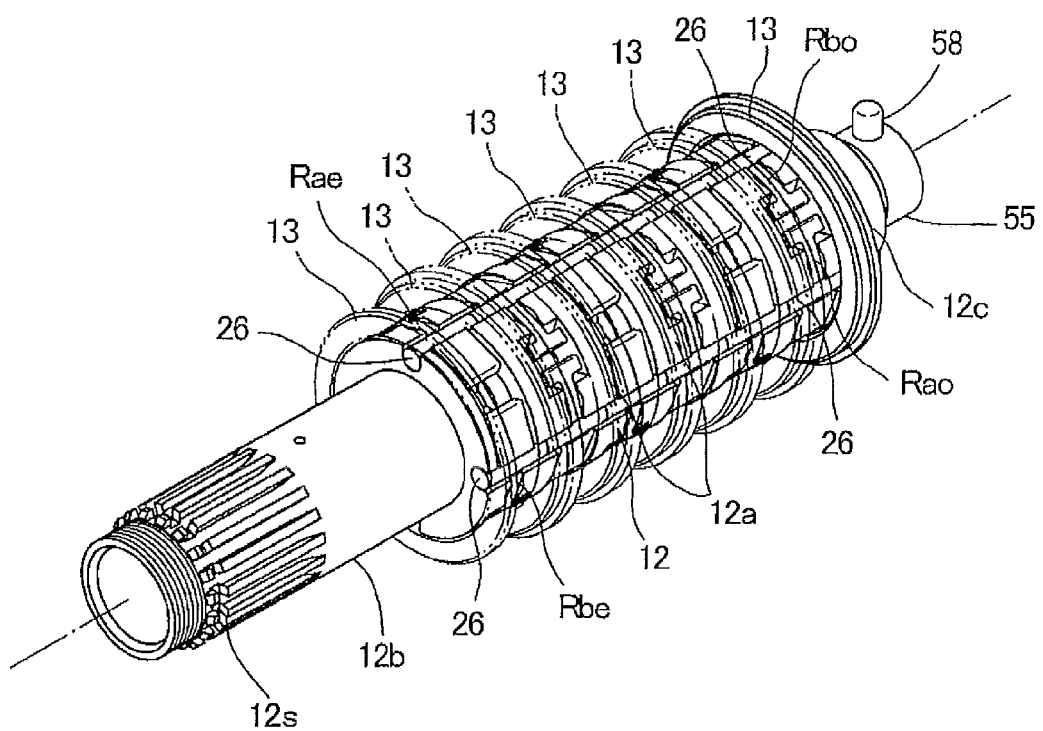
FIG. 12 is a perspective view showing a state in which bearing collar are assembled on the counter gear shaft in the state shown in FIG. 11.

As shown in FIG. 12, the bearing collars 13 are fitted in axial positions other than the positions of the longer rectangular recessed portion 12p and the shorter rectangular recessed portion 12q of the central cylindrical part 12a, and each bearing collar is arranged in an axial extent covering one pivot pin 26 and its adjacent pivot pin 26 which are put in the axial groove 12av continuously in line, whereby the pivot pins and the related swingable levers R are prevented from falling.

As the pivot pins 26 in the axial grooves 12av of the central cylindrical part 12a of the counter gear shaft 12 are fitted in such a depth that the outer surfaces of the pivot pins 26 lie in the same plane as the outside peripheral surface of the central cylindrical part 12a, the pivot pins are firmly fixed when the bearing collars 13 are fitted.

The seven bearing collars 13 are fitted on the counter gear shaft 12 at equal axial intervals and the driven transmission gears n are turnably supported between adjacent bearing collars 13.

Figure 13:
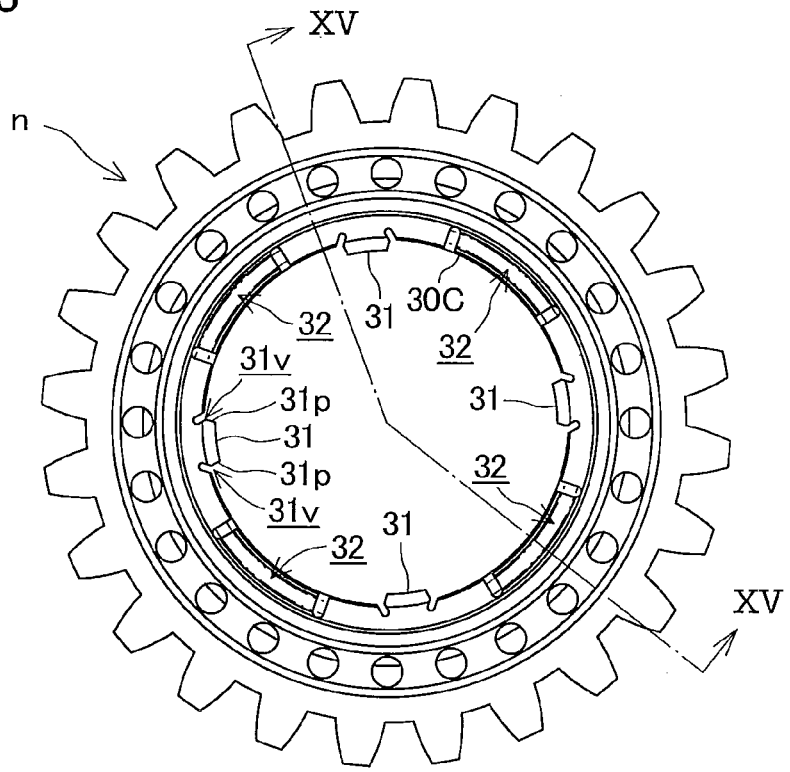
FIG. 13 is a right side view showing a driven transmission gear.
Figure 15:
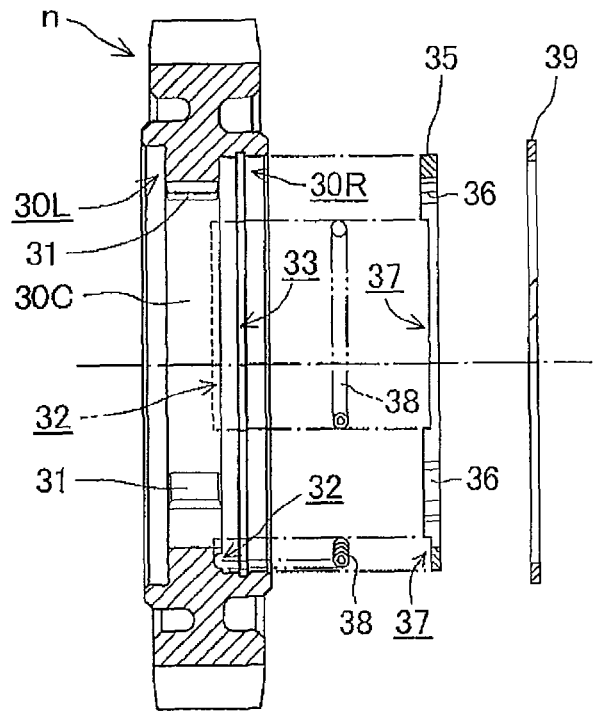
FIG. 15 is an exploded perspective view showing the driven transmission gear, the annular plate member and others.

As shown in FIGS. 13 and 15, each driven transmission gear n has left and right annular recesses 30L and 30R that are formed by axially cutting out the left and right peripheral portions thereof, and an annular inward protrusion 30C is toroidally formed between the left and right annular recesses 30L and 30R.

Figure 2:
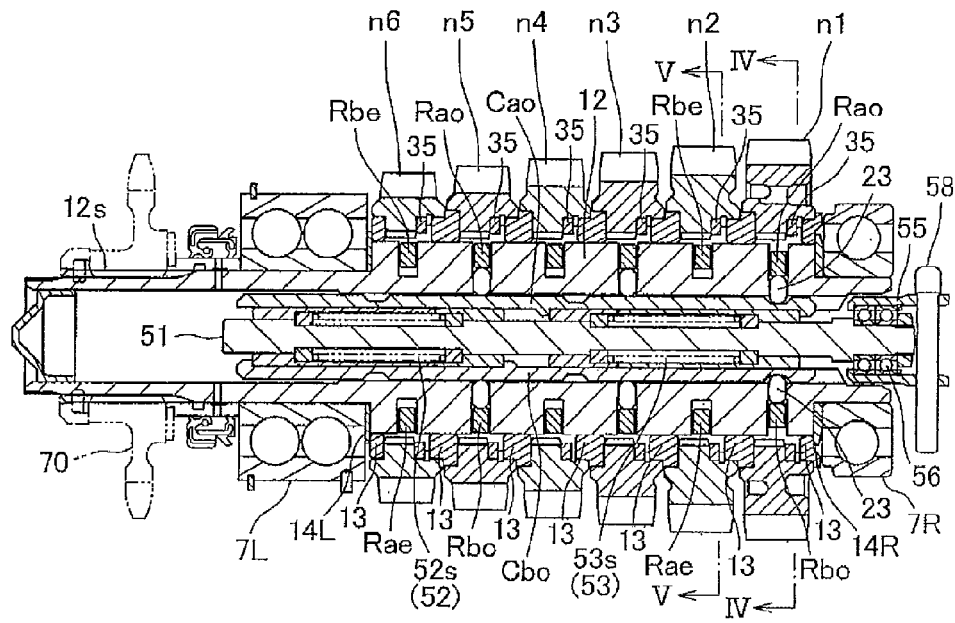
FIG. 2 is a sectional view showing a counter gear shaft and structures around the same (section taken along the line II-II in FIGS. 4 and 5)
Figure 3:
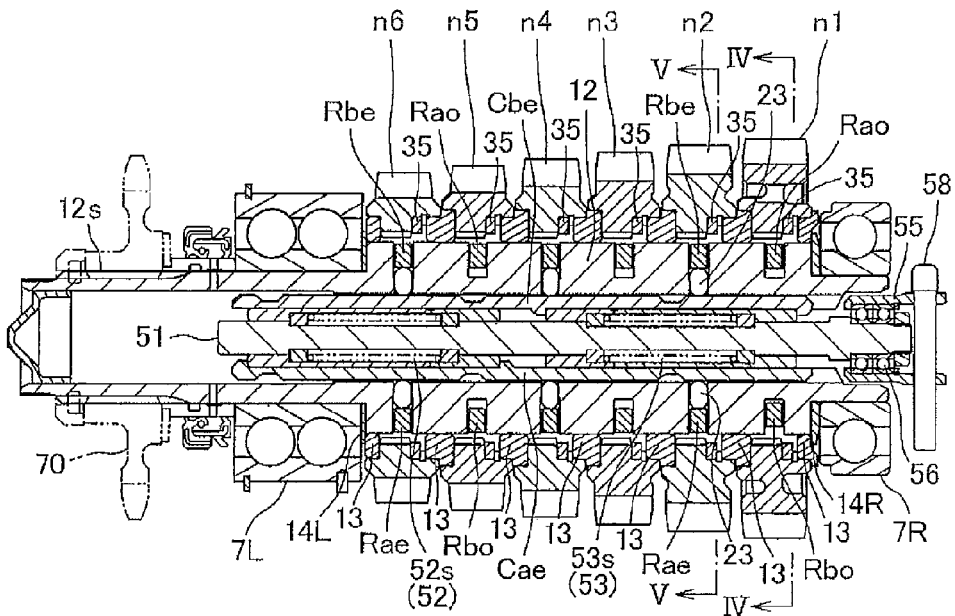
FIG. 3 is another sectional view showing the counter gear shaft and the structures around the same (section taken along the line III-III in FIGS. 4 and 5)

The diameter of the right annular recess 30R is slightly smaller than that of the left annular recess 30L of the driven transmission gear n, and the right annular h recess 30R is made deeper than the left annular recess 30L. On the outside periphery of each bearing collar 13, a left smaller-diameter part and a right larger-diameter part are formed, and thus a shoulder is formed in the axially middle part. The left smaller-diameter part of the right bearing collar 13 is slidably fitted into the right annular recess 30R of the smaller inside diameter, of the driven transmission gear n, and the right larger-diameter part of the left bearing collar 13 is slidably fitted into the left annular recess 30L of the larger inside diameter, so that the driven transmission gear n is turnably supported by the right and left bearing collars 13 (FIGS. 2 and 3).

In the manner as described above, the first, second, third, fourth, fifth and sixth driven transmission gears n1, n2, n3, n4, n5, n6 are turnably supported on the counter gear shaft 12 via the bearing collars 13.

Referring to FIGS. 13 and 15, four engaging projections 31 are protruded at circumferentially equal intervals from the inner surface of the annular inward protrusion 30C in the central part of the driven transmission gear n.

Each engaging projection 31 is in the shape of a circular arc in side view (in the axial view shown in FIG. 13), and the two end surfaces in the circumferential direction of the engaging projection 31 form sloping engaging surfaces 31p to be abutted and engaged by the engaging pawl Rp of the swingable lever R.

Grooves 31v are formed as radially outwardly convergent cutouts at the base portions of the engaging surfaces 31p on the two sides of the engaging projection 31. When the engaging pawl Rp abuts and engage any one of the engaging surfaces 31p of the engaging projection 31 to be pressed against the engaging surfaces 31p, stresses do not concentrate on the base portions of the engaging projection 31 because the grooves 31v disperse the stresses and the strength of the engaging projection 31 can be structurally enhanced.

Four arcuate grooves 32 are formed in circumferentially spaced disposition and between adjacent engaging projections 31 on the right side of the annular protrusion 30C, which is the bottom of the right annular recess 30R (see FIGS. 13 and 15).

An inside circumferential groove 33 is formed in a predetermined axial location on the inside peripheral surface of the right annular recess 30R (see FIG. 15).

An annular plate member 35 is relatively turnably fitted in the right annular recess 30R, the plate member 35 having an outside diameter substantially equal to the inside diameter of the right annular recess 30R and an inside diameter substantially equal to the inside diameter of the annular protrusion 30C.

The annular plate member 35 slidably contacts the right side of the annular protrusion 30C.

Figure 14:
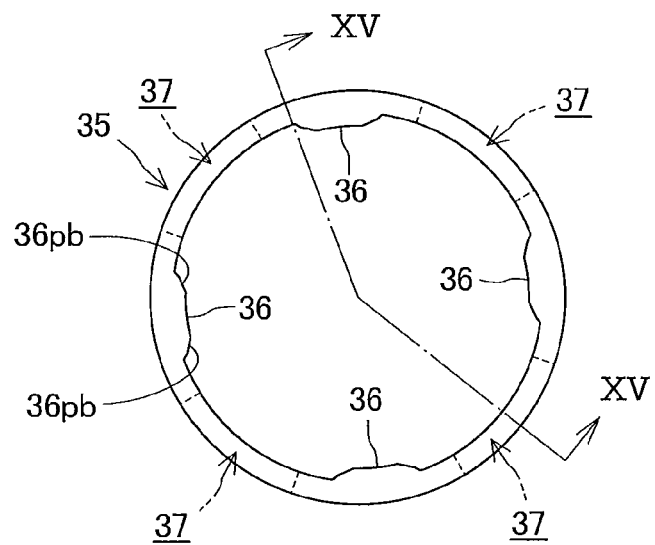
FIG. 14 is a right side view showing an annular plate member.

As shown in FIGS. 14 and 15, four abutment projections 36 protrude from the inside periphery of the annular plate member 35 at equal circumferential intervals. The abutment projections 36 is in the shape of a circular arc in side view (axial view shown in FIG. 14) like the engaging projections 31 of the driven transmission gear n, and the two end surfaces in the circumferential directions are inclined surfaces 36pb which can be abutted by the engaging pawl Rp of the swingable lever R.

The abutment projections 36 of the annular plate member 35 are longer in the circumferential direction than the engaging projections 31 of the driven transmission gear n.

Circular arc-shaped cutouts 37 are formed between adjacent ones of the four abutment projections 36 in the circumferential direction in the left side surface of the annular plate member 35 (see FIGS. 13 and 15).

The circumferential length of the circular arc-shaped cutouts 37 of the annular plate member 35 is equal to that of the arcuate grooves 32 of the driven transmission gear n, and the circular arc-shaped cutouts 37 and the arcuate grooves 32 are arranged in respectively opposing disposition (see FIG. 15).

When the annular plate member 35 is to be inserted into the right annular recess 30R of the driven transmission gear n, a coil spring 38 is fitted into each of the four arcuate grooves 32 and each of the four circular arc-shaped cutouts 37, in such a manner that the coil spring 38 is disposed within each groove 32 and each cutout, which are opposite to each other.

The four coil springs 38 resiliently set the positions of the annular plate member 35 relative to the driven transmission gear n. In the state in which the annular plate member is set in position, each abutment projection 36 of the annular plate member 35, except at least the portions of the inclined surfaces, overlaps each engaging projection 31 of the driven transmission gear n in axial view (see FIGS. 5 and 17).

Figure 17:
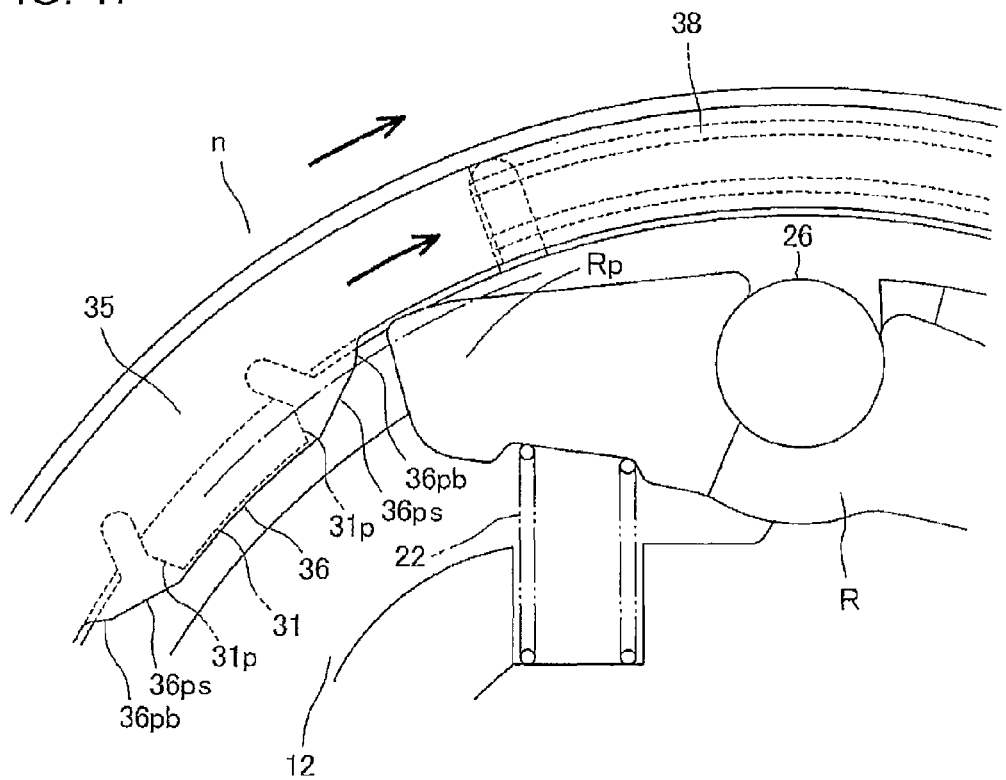
FIG. 17 is an enlarged view of a main part showing a state immediately before an abutment projection of the annular plate member abuts an engaging pawl of a swingable lever when the engaging pawl is largely protruded.

That is, as shown in FIG. 17, the two end parts forming the inclined surfaces 36pb, of each circumferentially elongated abutment projection 36 extend in circumferential directions beyond the two engaging surfaces 31p of each engaging projection 31.

In axial view, the circular arc-shaped surface on the top of each abutment projection 36 overlaps the circular arc-shaped surface on the top of each engaging projection portion 31 or extends slightly toward the rotational center axis than the top of each engaging projection 31.

Figure 16:
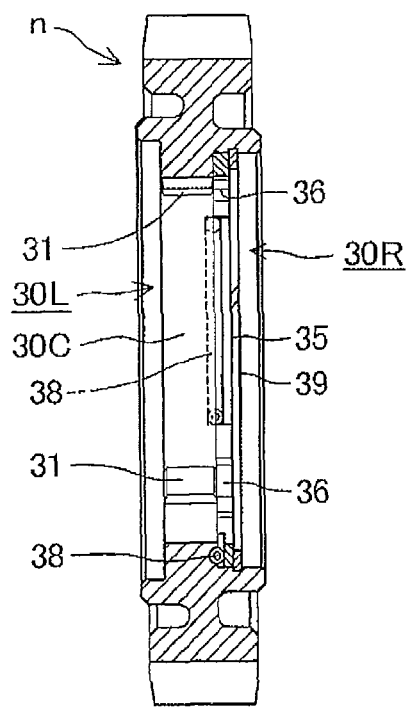
FIG. 16 is a sectional view showing a state in which the driven transmission gear, the annular plate member and others are assembled.

A circlip 39 is fitted into the inside peripheral groove 33 formed in the internal surface of the right annular recess 30R, whereby the annular plate member 35 is axially set in position relative to the driven transmission gear n (see FIG. 16).

As described above, the annular plate member 35 inserted in the right annular recess 30R of the driven transmission gear n is resiliently set in position by the coil springs 38. Therefore, the forces of the coil springs 38 act in directions in which the annular plate member 35 returns to its set position when the annular plate member 35 is turned relative to the driven transmission gear n.

FIG. 17 shows in an enlarged view the abutment projection 36 of the annular plate member 35 and its vicinity in a state in which the annular plate member 35 is resiliently set in position relative to the driven transmission gear n by the coil springs 38 without being influenced by external forces.

As shown in FIG. 17, each inclined end surface of the abutment projection 36 of the annular plate member 35, which is to be abutted by the engaging pawl Rp of the swingable lever R, is made up of a bottom-side inclined surface 36*pb* having such an inclination that the engaging pawl Rp can engage it and a top-side inclined surface 36*ps* having such an inclination that the engaging pawl Rp slidingly abuts it without engagement.

Each bottom-side inclined surface 36*pb* of the abutment projection 36 on the bottom side close to the inside periphery of the annular plate member 35 is an inclined surface in which the inclination angle to a tangent at the position where the inclined surface rises from the inner periphery of the annular plate member 35 is steeper than the inclination angle of the top-side inclined surface 36*ps*. When the engaging pawl Rp touches the bottom-side inclined surface 36*pb*, the engaging pawl Rp make engagement without sliding movement.

In the meantime, the top-side inclined surface 36*ps* on the top side of each abutment projection 36, remote from the inside periphery of the annular plate member 35, forms a gentle slope which is bent from the bottom-side inclined surface 36*pb*. Therefore, when the engaging pawl Rp touches the top-side inclined surface 36*ps* which is the gentle slope, large force is exerted to the engaging pawl Rp to press it toward the center axis of rotation from the top-side inclined surface 36*ps*, so that the engaging pawl is swung against the forces of the compression springs 22 and slides on the top-side inclined surface 36*ps*, and the engaging pawl rides over the abutment projection 36 without engaging the same.

At this time, the annular plate member 35 resiliently set in position by the coil springs 38 is hardly turned relative to the driven transmission gear n.

FIGS. 17 to 20 show how the annular plate member 35, the driven transmission gear n and the counter gear 12 are moved, when the engaging pawl Rp of the swingable lever R has been swung outward to a great extent immediately before the engaging pawl Rp abuts the annular plate member 35.

FIG. 17 shows a state in which the driven transmission gear n is being turned together with the annular plate member 35, which is resiliently set in position by the coil spring 38 and in which the swingable lever R has been swung by the force of the related compression spring 22 and the engaging pawl Rp is protruded outward. The engaging pawl Rp is shown in the figure in a state immediately before it abuts the abutment projection 36 which is turning ahead of the engaging projection 31. Since the engaging pawl Rp has been fully swung outward, the bottom-side inclined surface 36*pb*, which is the steeper sloping surface, of the abutment projection 36 is going to abut the engaging pawl Rp.

Figure 18:
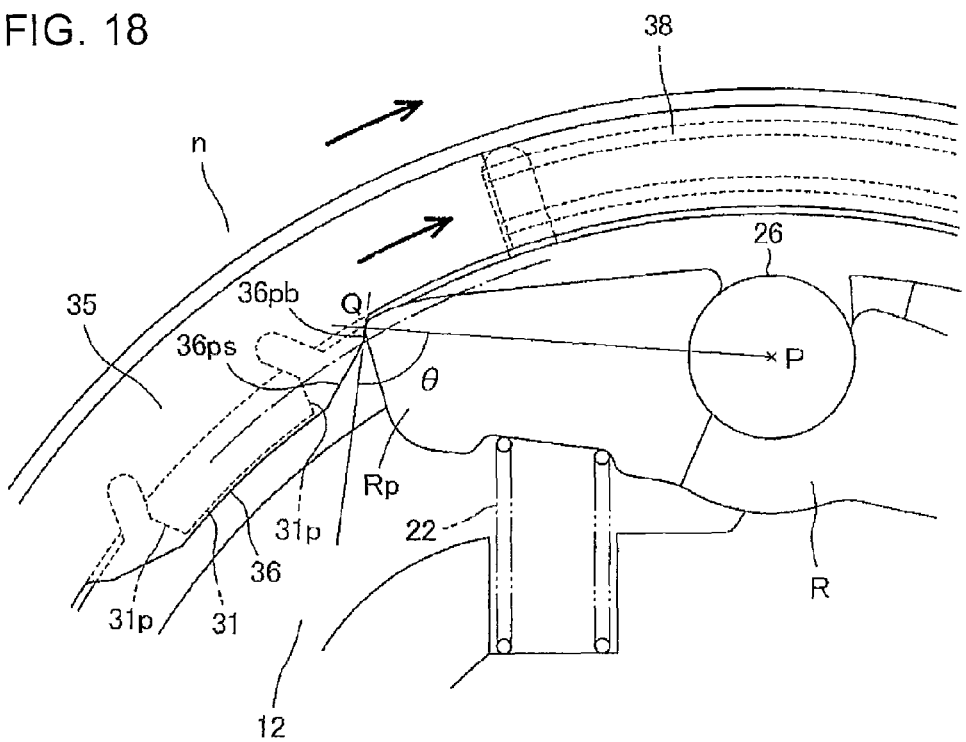
FIG. 18 is an enlarged view of the main part showing a state in which the abutment projection of the annular plate member next abuts the engaging pawl.

FIG. 18 shows a state in which the bottom-side inclined surface 36*pb* of the abutment projection 36 of the annular plate member 35 has touched the tip end of the engaging pawl Rp of the swingable lever R. As the bottom-side inclined surface 36*pb* is steep, the engaging pawl Rp engages the bottom-side inclined surface 36*pb* without sliding motion.

Figure 19:
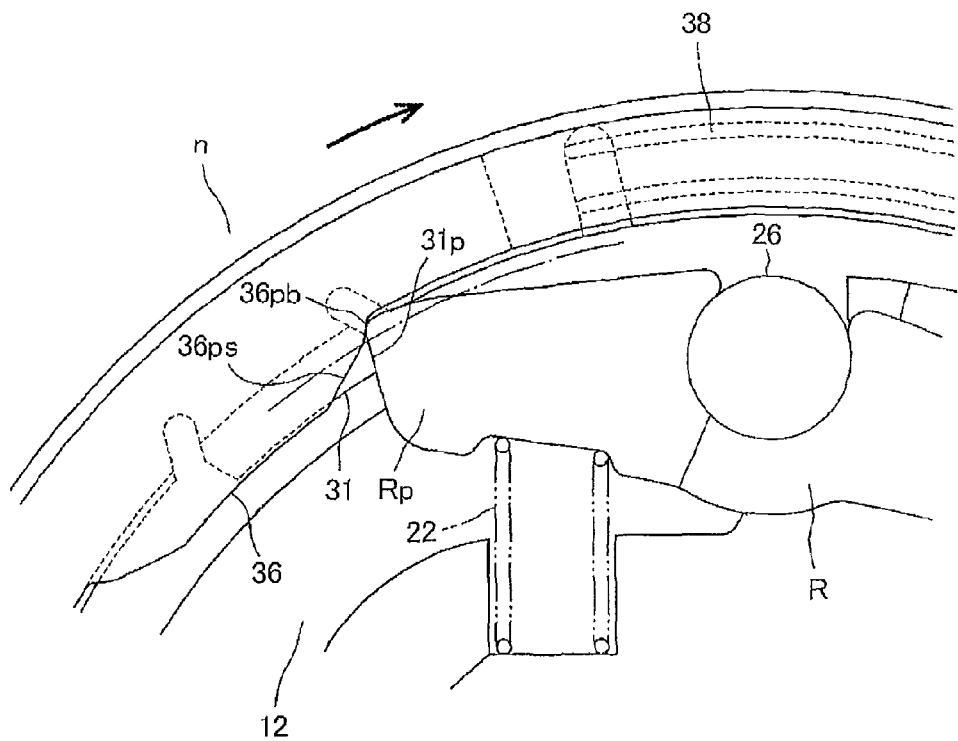
FIG. 19 is an enlarged view of the main part showing a state in which an engaging projection of the driven transmission gear next engages the engaging pawl.

Accordingly, the annular plate member 35 is prevented from turning by the engagement of the engaging pawl Rp, the driven transmission gear n is turned relative to the annular plate member 35 against the forces of the coil springs 38, and, as shown in FIG. 19, the engaging surface 31*p* of the engaging projection 1 of the driven transmission gear n abuts and engages the engaging pawl Rp.

Figure 20:
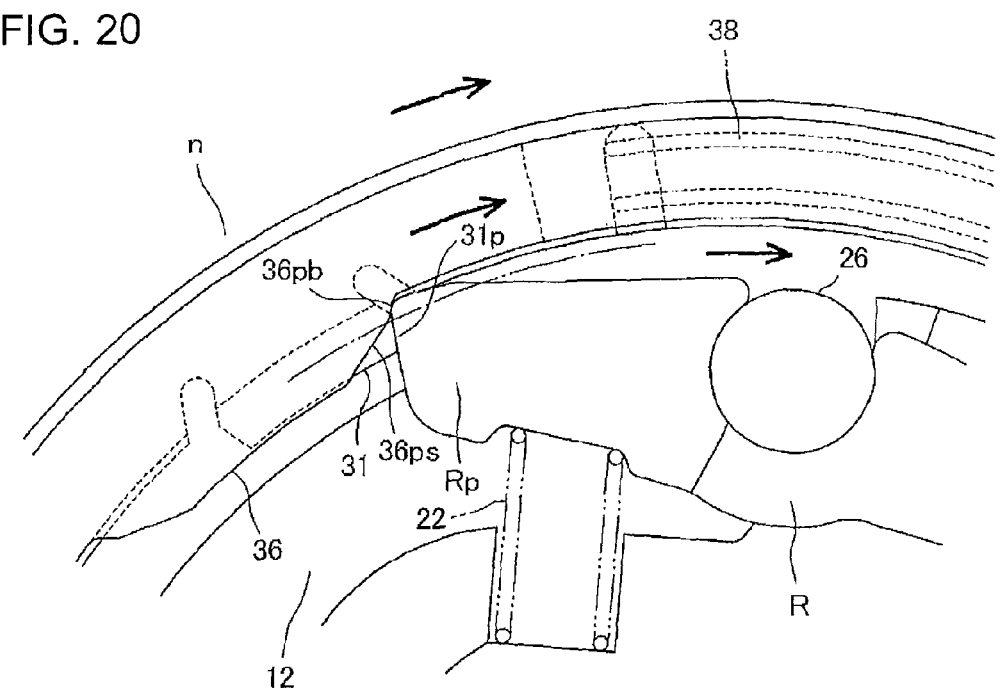
FIG. 20 is an enlarged view of the main part showing a state in which the engaging projection of the driven transmission gear next engages the engaging pawl and rotates the counter gear shaft together.

As the engaging pawl Rp collides with the engaging projection 31 of the driven transmission gear n in a state in which the engaging pawl is sufficiently protruded, the engaging pawl can engage without receiving too large local load, and as shown in FIG. 20, the rotation of the driven transmission gear n is transmitted to the counter gear shaft 12 via the swingable levers R.

FIGS. 21 to 24 show how the annular plate member 35, the driven transmission gear n and the counter gear shaft 12 when the engaging pawl Rp of the swingable lever R has swung outward to a small extent immediately before the engaging pawl Rp abuts the annular plate member 35.

Figure 21:
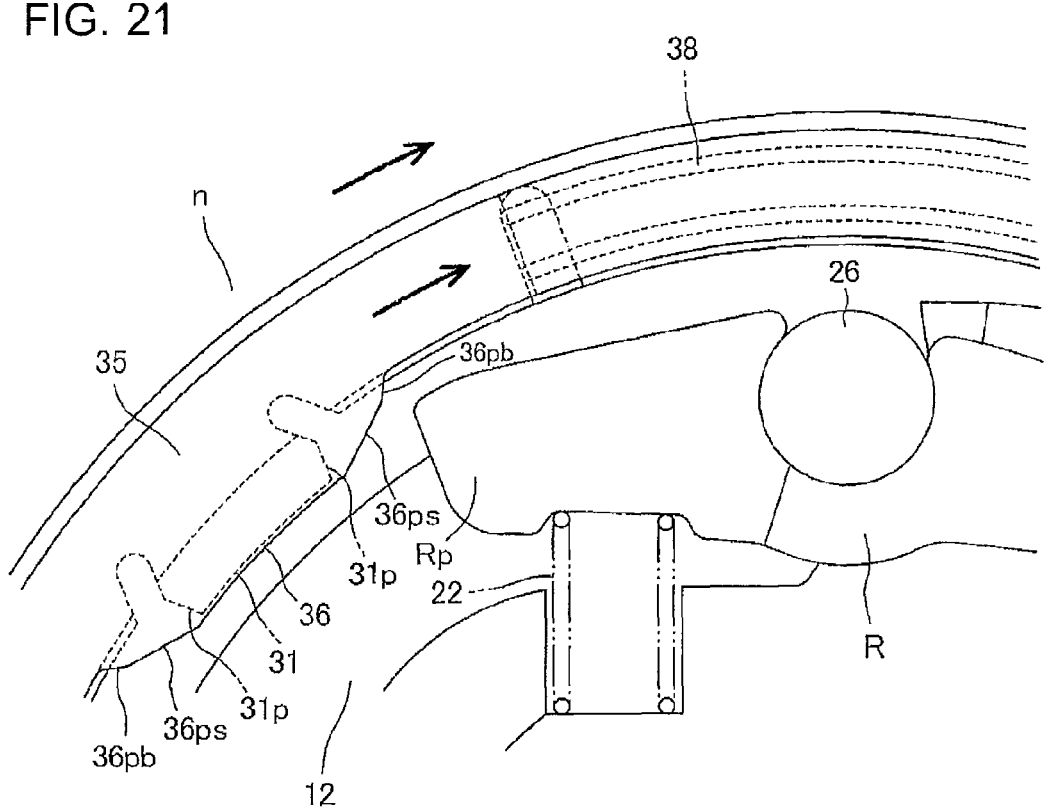
FIG. 21 is an enlarged view of the main part showing a state immediately before the abutment projection of the annular plate member abuts the engaging pawl of the swingable lever when the engaging pawl is slightly protruded.

FIG. 21 shows a state in which the swingable lever R has swung to cause its engaging pawl Rp to protrude outward to a small extent while the driven transmission gear n is being rotated together with the annular plate member 35 and in which the engaging pawl Rp is immediately before it abuts the abutment projection 36 which is ahead of the engaging projection 31. Since the engaging pawl Rp has protruded insufficiently to a small extent, the top-side inclined surface 36*ps*, which is the gentle slope of the abutment projection 36, is going to abut the engaging pawl Rp.

Figure 22:
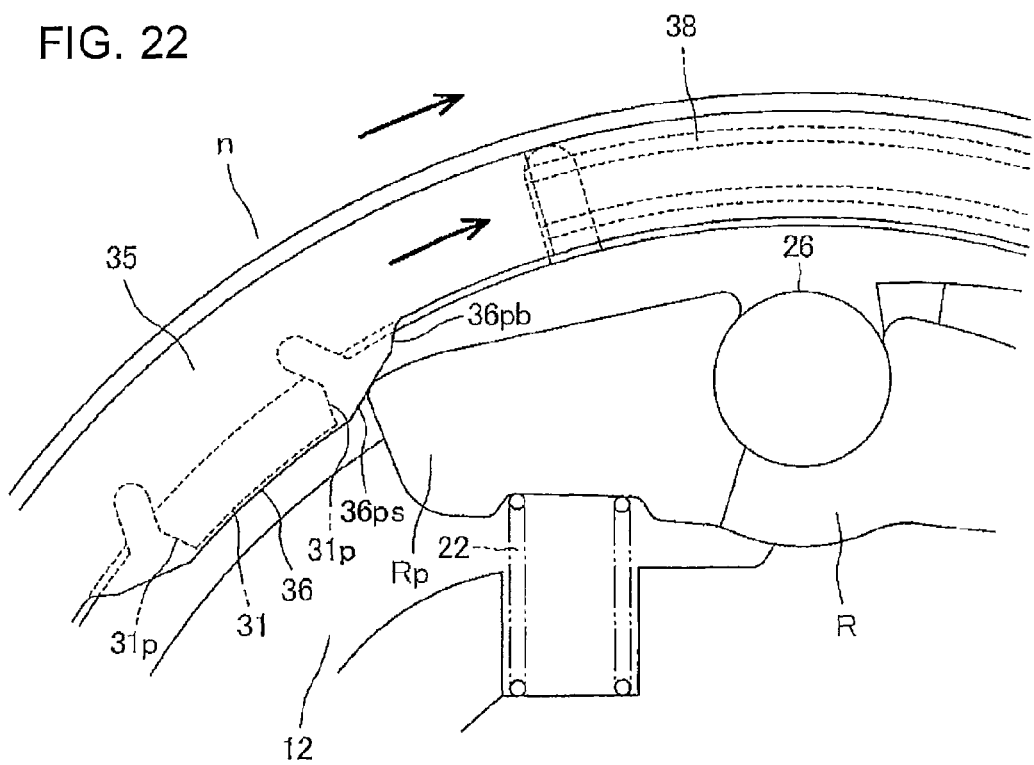
FIG. 22 is an enlarged view of the main part showing a state in which the abutment projection of the annular plate member next abuts the engaging pawl.

FIG. 22 shows a state in which the top-side inclined surface 36*ps* of the abutment projection 36 of the annular plate member 35 has abutted the tip end of the engaging pawl Rp of the swingable lever R. As the top-side inclined surface 36*ps* is the gentle slope, large force is exerted to the engaging pawl Rp to press the same toward the center axis of rotation from the top-side inclined surface 36*ps*.

Figure 23:
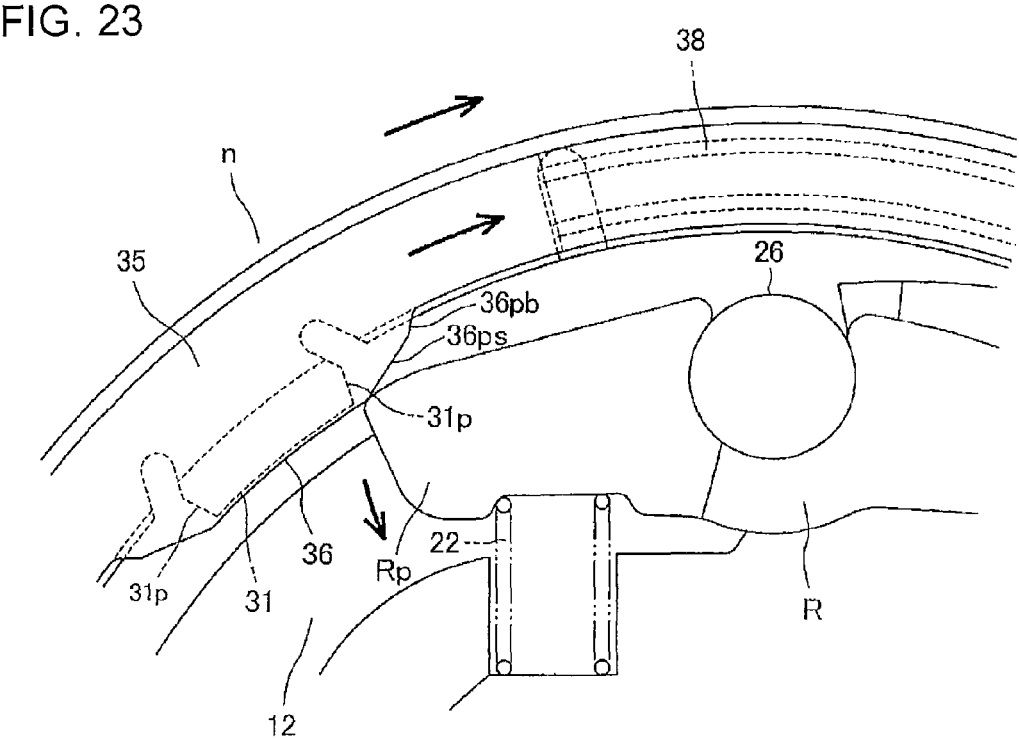
FIG. 23 is an enlarged view of the main part showing a state in which the engaging pawl is next swung, sliding on a top inclined surface of the abutment projection.

Therefore, as shown in FIG. 23, the swingable lever R is swung against the force of the compression spring 22, the engaging pawl Rp is swung toward the center axis of rotation, sliding along the top-side inclined surface 36*ps* without engaging the top-side inclined surface 36*ps*, so that the engaging pawl Rp retracts inward.

Figure 24:
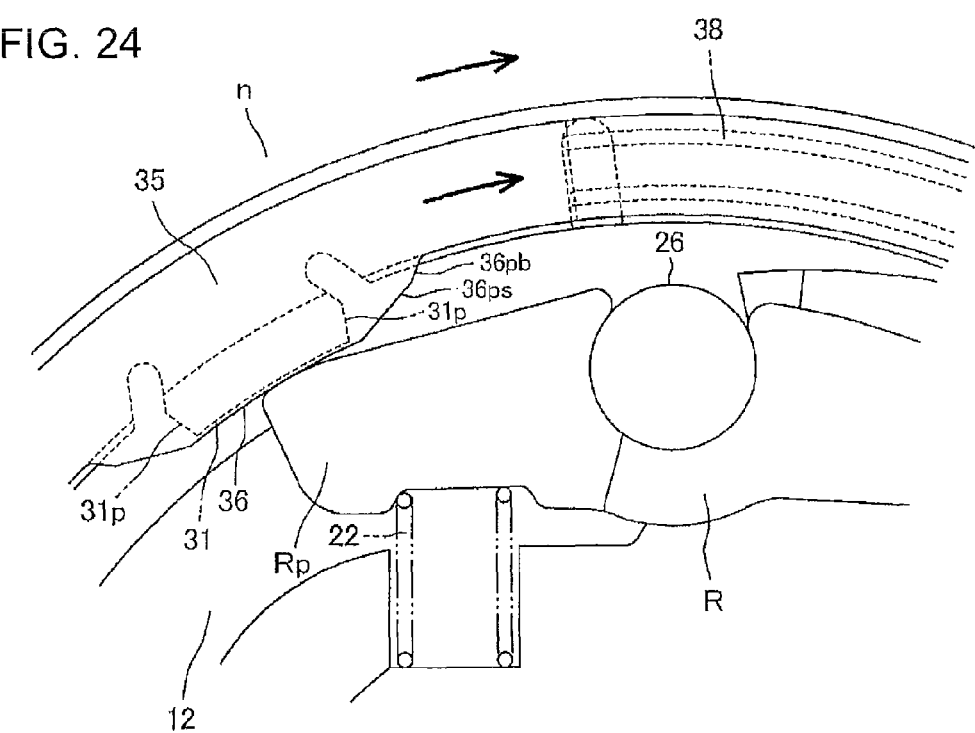
FIG. 24 is an enlarged view of the main part showing a state in which the engaging pawl next rides over the abutment projection of the annular plate member.
Figure 25:
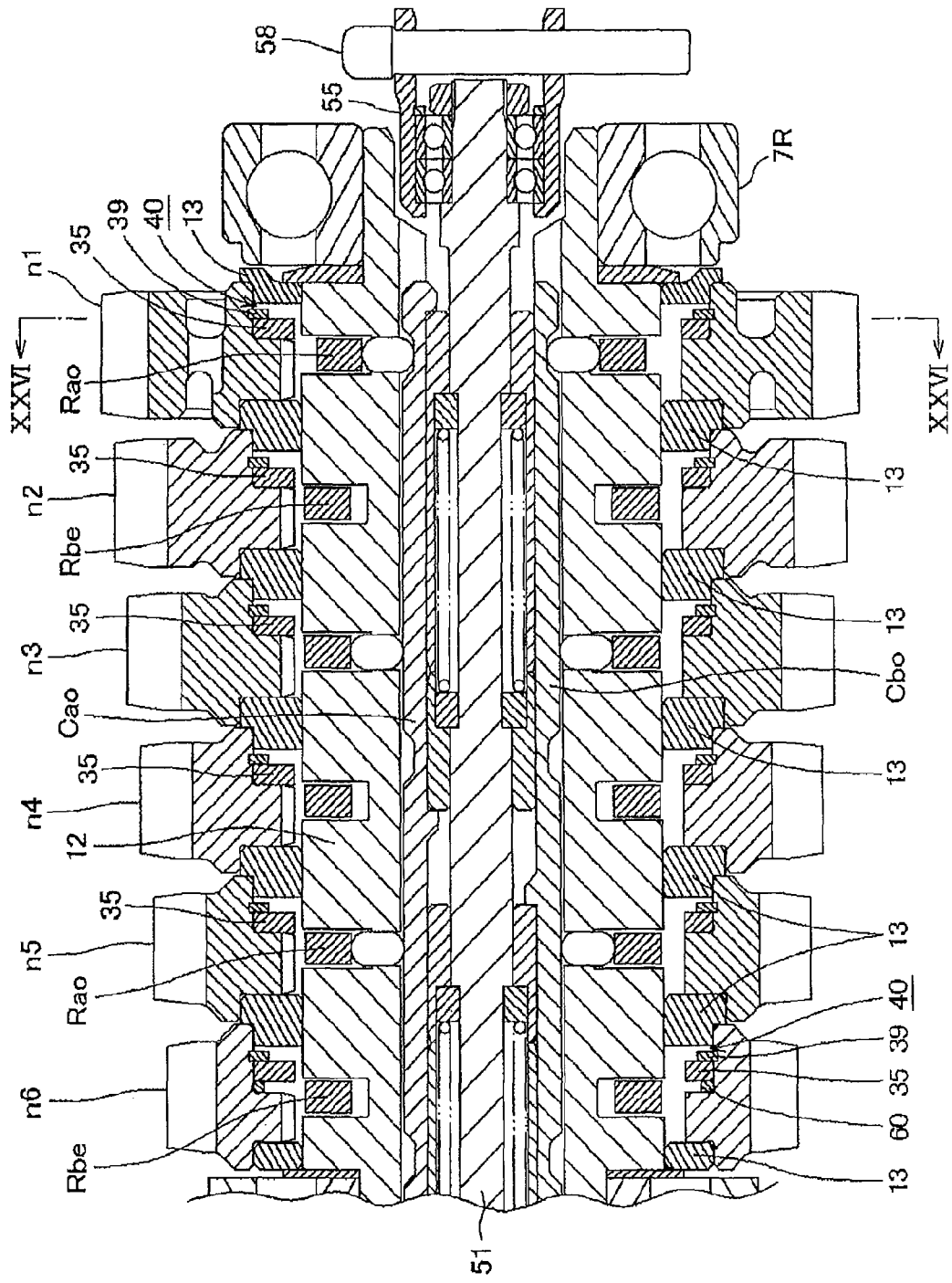
FIG. 25 is a sectional view showing a counter gear shaft and a structure around the same, of a multistage transmission according to another embodiment of this invention.

Accordingly, as shown in FIG. 24, the engaging pawl Rp of the swingable lever R reaches the circular arc-shaped surface at the top of the abutment projection 36 of the annular plate member 35, which has almost not turned relative to the driven transmission gear n due to the forces of the coil springs 38. Therefore, the engaging pawl Rp rides over the abutment projection 36. The action of the engaging pawl Rp riding over the abutment projection 36 means that the engaging pawl Rp rides over the engaging projection 31 of the driven transmission gear n. Thus, the engaging pawl Rp does not engage the engaging projection 31 so that no power is transmitted via the engaging projection 31.

However, as the engaging pawl Rp can protrude outward to a large extent relative to the abutment projection 36 of the annular plate member 35, which comes next, the engaging pawl Rp will engage the engaging projection 31 according to the sequence shown in FIGS. 18 to 21, whereby power is transmitted.

As described above, the quantity by which the engaging pawl Rp of the swingable lever R protrudes outward is sorted by the operation of the inclined surfaces 36*pb*, 36*ps* of the annular plate member 35, whereby it is prevented that the engaging pawl Rp of the swingable lever R is engaged with the engaging projection 31 of the driven transmission gear n in a state in which the engaging pawl Rp is insufficiently protruded only a small quantity. Therefore, it is avoided that the tip end of the engaging pawl Rp collides with the engaging projection 31 and that an excessive load is applied to a part of the tip end to such a degree that the tip end is damaged.

The engaging projection 31 of the drive transmission gear n is provided with the engaging surface 31*p* and 31*p* at both the ends thereof in the circumferential directions, and likewise the abutment projection 36 of the annular plate member 35 is provided with the inclined surfaces 36*pb* and 36*ps* at both the ends in the circumferential directions. Therefore, also in the case of reverse rotation, the annular plate member 35 operates in the same way in relation to the engagement of the swingable lever R and the engaging projection 31 of the driven transmission gear n, and a situation that an excessive load is applied to the tip part of the engaging pawl Rp is avoided.

A pair of swingable levers R are provided symmetrically with respect to the center axis of the counter gear shaft 12 for simultaneous engagement of the swingable levers R with the engaging projections 31 of the driven transmission gear n, and it must be avoided that one lever is engaged but the other is not engaged.

For that purpose, both the engaging pawls Rp of the pair of swingable levers R must respectively abut both the bottom-side inclined surfaces 36pb of the annular plate member 35.

For realizing the abutment exactly at the same time, high precision of machining and assembling of the swingable levers R, the annular plate members 35 and so on is required and this increases the production costs.

In view of this, the inclination angle of the bottom-side inclined surfaces 36pb of the annular plate member 35 is given consideration.

That is, as shown in FIG. 18, the angle $\theta$ between the bottom inclined surface 36pb and a straight line PQ linking a contact point Q, at which the engaging pawl Rp of the swingable lever R contacts the bottom-side inclined surface 36pb, and the swing center P (the axis of the pivot pin 26) of the swingable lever R is made an obtuse angle close to the right angle. In the case shown in FIG. 18, the angle $\theta$ is 93 degrees.

The degree of precision required for the manufacture and assembly of parts such as the swingable lever R and the annular plate member 35 is not very high. Moreover, the bottom-side inclined surface 36pb is erected such that the angle $\theta$ exceeds 90 degrees. For these reasons, even if only one of the engaging pawls Rp of the swingable levers R forming the pair abuts earlier one of the bottom-side inclined surfaces 36pb forming the pair, of the annular plate member 35, the other engaging pawl Rp is swung later and can be abutted with the other bottom-side inclined surface 36pb.

Therefore, even if the engaging pawls Rp of the swingable levers R forming the pair are not simultaneously abutted with the bottom-side inclined surfaces 36pb, forming the pair, of the annular plate member 35, the engaging pawls Rp are sequentially swung and can make abutment, so that a situation where one swingable lever R cannot engage one engaging projection 31 of the driven transmission gear n can be avoided.

The angle $\theta$ between the straight line PQ and the bottom-side inclined surface 36pb is preferably "90 degrees $<\theta<100$ degrees".

When the angle $\theta$ exceeds 100 degrees, the engaging pawl Rp may be slid without abutting the bottom-side inclined surface 36pb.

The swingable levers Rao for normal rotation and odd-number speed (the swingable levers Rae for normal rotation and even-number speed) and the swingable levers Rbo for reverse rotation and odd-number speed (the swingable levers Rbe for reverse rotation and even-number speed) have their engaging pawls Rp and Rp extended at mutually opposite positions. The swingable levers Rao for normal rotation and odd-number speed (the swingable levers Rae for normal rotation and even-number speed) abut and engage the related engaging projections 31 in the direction of the normal rotation of the driven transmission gears n (and the counter gear shaft 12), while the swingable levers Rbo for reverse rotation and odd-number speed (the swingable levers Rbe for reverse rotation and even-number speed) abut and engage the related engaging projections 31 in the direction of the reverse rotation of the driven transmission gears n.

The swingable levers Rao for normal rotation and odd-number speed (the swingable levers Rae for normal rotation and even-number speed) do not engage the engaging projections even if their engaging pawls Rp are protruded outward when the related driven transmission gear n is turned in the reverse direction. Likewise, the swingable levers Rbo for reverse rotation and odd-number speed (the swingable levers Rbe for reverse rotation and even-number speed) do not engage the engaging projections even if their engaging pawls Rp are protruded outward when the related driven transmission gear n is turned in the normal direction.

When the cam rods C are located in the neutral positions, all the driven transmission gears n are in a non-engaging state in which the pins 23 are protruded outward due to the positions of the cam rods C of the related engagement means 20. The pin abutting parts Rr of the swingable levers R are pushed outward, the engaging pawls Rp are drawn inward, and the driven transmission gears are freely turned relative to the counter gear shaft 12.

On the other hand, when the pins 23 enter the cam grooves v due to movement of the cam rods C of the related engagement means 20 to positions other than the neutral positions, the swingable levers R are swung to positions enabling engagement in which the engaging pawls Rp protrude outward, the engaging projections 31 of the related driven transmission gear n engage the engaging pawls Rp after abutment with the abutment projections 36 of the annular plate member 35, and the rotation of the driven transmission gear n is transmitted to the counter gear shaft 12 or the rotation of the counter gear shaft 12 is transmitted to the driven transmission gear n.

In the shift driving means 50, the shift drum 67 is turned by a predetermined quantity by manual operation of the shift select lever, the turning of the shift drum 67 causes axial movement of the control rod 51 by a predetermined quantity via the shift pin 58 fitted in the shift groove 67v, and the eight cam rods Cao, Cao, Cae, Cae, Cbo, Cbo, Cbe and Cbe of the engagement means 20 are moved interlockingly via the lost motion mechanisms 52 and 53.

When the cam rods C are axially moved, the pins 23 in slidingly contact with the cam surfaces of the cam rods C move into and out of the cam grooves v to advance and retreat, so that the swingable levers R are swung, engagement with one of the driven transmission gears n is released, engagement with another driven transmission gear n is established, and speed shift is carried out by changing driven transmission gear n to be engaged with the counter gear shaft 12.

To carry out the shift drive, the shift drum 67 is turned by manual operation of the shift select lever to make a speed shift, however, shift may be made by operating a shift driving motor and turning the shift drum via a Geneva stop mechanism and so on.

The power of the internal combustion engine is transmitted to the main gear shaft 11 via the friction clutch 5 to rotate the first, second, third, fourth, fifth and sixth driving transmission gears m1, m2, m3, m4, m5 and m6, so that the first, second, third, fourth, fifth and sixth driven transmission gears n1, n2, n3, n4, n5 and n6 constantly in mesh with these driving transmission gears, respectively, are turned at respective rotational speeds.

Figure 4:
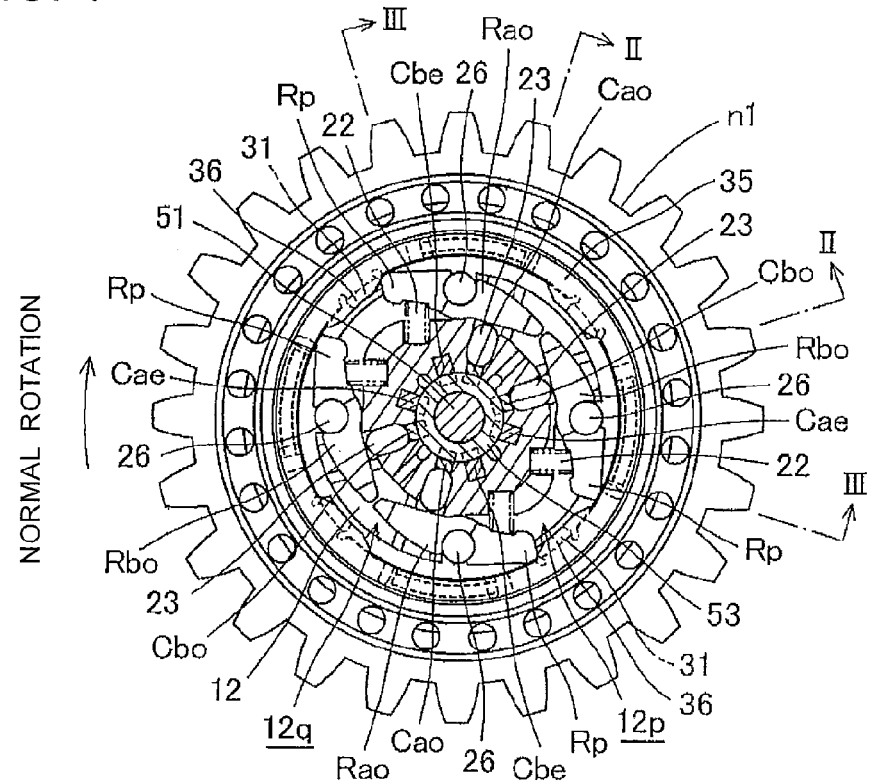
FIG. 4 is a sectional view taken along the line IV-IV in FIGS. 2 and 3.
Figure 5:
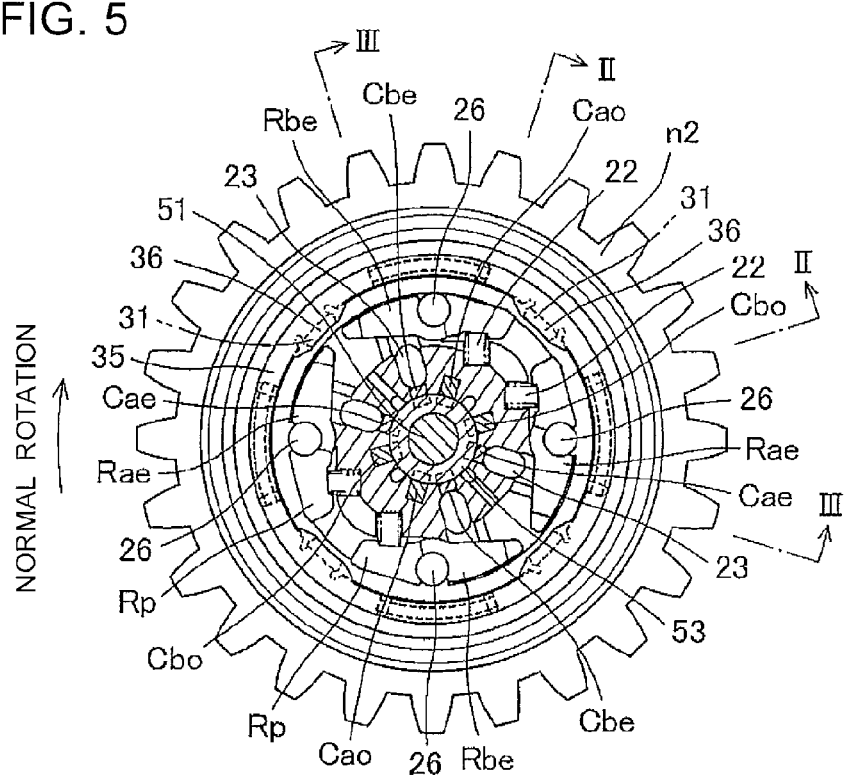
FIG. 5 is a sectional view taken along the line V-V in FIGS. 2 and 3.

FIGS. 2 to 5 show a state of the first speed. In FIG. 4, the first driven transmission gear n1 is turned in the direction shown by the arrow, while, in FIG. 5, the second driven transmission gear n2 is turned in the direction shown by the arrow. The second driven transmission gear n2 is turned at a higher speed than the first driven transmission gear n1.

Only the pins 23 of the engagement means 20 related to the first driven transmission gear n1 are in the cam grooves v1 of the cam rods Cao for normal rotation and odd-number speed and the cam rods Cbo for reverse rotation and odd-number speed (see FIG. 2). Accordingly, the swingable levers Rao for normal rotation and odd-number speed of the engagement means 20 cause their engaging pawls Rp to protrude outward, so that the engaging projections 31 of the rotating first driven transmission gear n1 engage the engaging pawls Rp of the swingable levers Rao for normal rotation and odd-number speed (see FIG. 4), and the counter gear shaft 12 is rotated together with the first driven transmission gear n1 at the same rotational speed as the first driven transmission gear n1.

In the state of the first speed, the second driven transmission gear n2 is in idle state because the pins 23 of the relating engagement means 20 are out of the cam grooves v2 of the cam rods Cae and Cbe for even-number speed and are protruded outward (see FIG. 3), so that the engaging pawls Rp of the swingable levers Rae and Rbe for even-number speed of the engagement means 20 are drawn inward.

The other third, fourth, fifth and sixth driven transmission gears n3, n4, n5 and n6 are also likewise in idle state (see FIGS. 2 and 3).

When the shift drum 67 is turned by manual operation of the shift select lever and the control rod 51 is axially moved rightward so as to shift to the second speed, the eight cam rods Cao, Cao, Cae, Cae, Cbo, Cbo and Cbe, Cbe are given axial forces to move axially rightward via the coil springs 52s and 53s of the lost motion mechanisms 52 and 53.

The swingable levers Rao for normal rotation and odd-number speed operated via the pins 23 are being engaged with the engaging projections 31 of the first driven transmission gear n1 and are receiving forces from the first driven transmission gear n1. Therefore, there are considerably large frictional resistances to the swing motion of the swingable levers Rao for normal rotation and odd-number speed to release the engagement, and the cam rods Cao for normal rotation and odd-number speed are not moved immediately. Therefore, the cam rods Cbe for reverse rotation and even-number speed also remain immovable. However, the cam rods Cae for normal rotation and even-number speed and the cam rods Cbo for reverse rotation and odd-number speed are moved without resistance.

The engaging pawls Rp of the swingable levers Rbo for reverse rotation and odd-number speed of the first speed are drawn inward by the movement of the cam rods Cbo for reverse rotation and odd-number speed.

The pins 23 enter the cam grooves v2 by the movement of the cam rods Cae for normal rotation and even-number speed. Therefore, the swingable levers Rae for normal rotation and even-number speed associated with the second driven transmission gear n2 are swung by the forces of the compression springs 22 and the centrifugal forces acting on the engaging pawls Rp, so that the engaging pawls Rp are protruded outward and can engage the second driven transmission gear n2. Consequently, the engaging projections 31 of the second driven transmission gear n2 rotating at a higher speed than the counter gear shaft 12 rotating together with the first driven transmission gear n1 catch up with, and abut the outwardly protruded engaging pawls Rp of the swingable levers Rae for normal rotation and even-number speed.

Immediately after this, the counter gear shaft 12 starts rotating at the same rotational speed as the second driven transmission gear n2, which is rotating at a higher speed than the first driven transmission gear, the engaging pawls Rp of the swingable levers Rao for normal rotation and odd-number speed are separated from the engaging projections 31 of the first driven transmission gear n1, and an actual upward shift from the first speed to the second speed is executed.

When the engaging pawls Rp of the swingable levers Rao for normal rotation and odd-number speed are separated from the engaging projections 31 of the first driven transmission gear n1, the frictional resistance that fixes the swingable levers Rao for normal rotation and odd-number speed disappear, the cam rods Cao for normal rotation and odd-number speed that have been pushed by the coil spring 53s of the lost motion mechanism 53 are moved rightward with a delay. Consequently, the pins 23 located in the cam grooves v1 move out of the cam grooves, the swingable levers Rao for normal rotation and odd-number speed of the first speed are swung, and their engaging pawls Rp are drawn inward.

The up-shift from the first speed to the second speed having a speed reduction ratio smaller by one stage is executed as described above. That is, in a state in which the engaging projections 31 of the first driven transmission gear n1 are abutted and engaged by the engaging pawls Rp of the swingable levers Rao for normal rotation and odd-numbered speed and in which the counter gear shaft 12 is rotated at the same speed as the first driven transmission gear n1, the engaging projections 31 of the second driven transmission gear n2 rotating at a higher speed catch up with, and engage the engaging pawls Rp of the swingable levers Rae for normal rotation and even-number speed, and the counter gear shaft 12 is rotated at a higher speed together with the second driven transmission gear n2 to execute the shift. Therefore, the engaging pawls Rp of the swingable levers Rao for normal rotation and odd-number speed are naturally separated from the engaging projections 31 of the first driven transmission gear n1 for smooth disengagement, no force is required to release the engagement, and smooth operation and up-shift are achieved.

Likewise, in each shift from the second speed to the third speed, from the third speed to the fourth speed, from the fourth speed to the fifth speed and from the fifth speed to the sixth speed, the driven transmission gear n having a speed reduction ratio smaller by one stage from the present speed is engaged with the associated swingable levers R in a state in which the driven transmission gear n of the present speed is engaged with the associated swingable levers R, to execute a speed shift. Therefore, a smooth operation is enabled without the force to release the engagement, no clutch for the shift is required, there is no loss in the change-over time for the shift, there is no loss in the driving force, shift shock is small, and a smooth shift can be realized.

Likewise, also in the case of down-shift, the swingable levers R are engaged with the associated driven transmission gear n having a speed reducing ratio larger by one stage than that of the present speed, in a state in which the driven transmission gear n of the present speed is in engagement with the associated swingable levers R, to execute the downward shift. Therefore, no force for releasing the engagement is required, smooth operation is enabled, no clutch for the shift is required, there is no loss of the switching time in the down-shift, there is no loss of the driving force, shift shock is small, and smooth down-shift can be executed.

As described above, the quantity of radial protrusion of the engaging pawl Rp of each swingable lever R is detected by means of the inclined surfaces 36pb and 36ps of the annular plate member 35, when each driven transmission gear n is to be engaged with each swingable lever R. This serves to avoid the engagement of the engaging pawls with the engaging projections 31 of each driven transmission gear n in a state in which the engaging pawls are not able to protrude sufficiently and protrude only a small amount. This ensures that the engaging pawls are securely engaged in a state in which they are largely protruded, excessive local load is prevented from being imposed to the tip ends of the engaging pawls Rp and the swingable lever is miniaturized.

A modified embodiment of the invention will be described with reference to FIGS. 26 to 34.

The multistage transmission according to this modified embodiment has the same construction as the multistage transmission according to the embodiment described above except for the two points to be described below. The same reference signs are used for the same parts.

Figure 26:
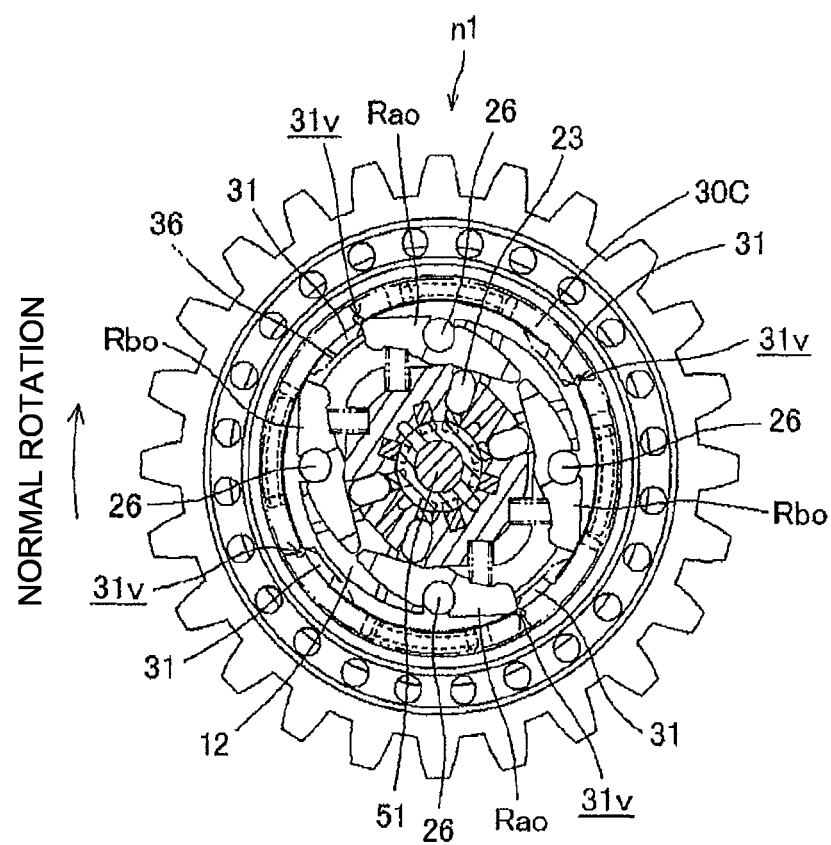
FIG. 26 is a sectional view taken along the line XXVI-XXVI in FIG. 25.

The multistage transmission 10 described above has the first, second, third, fourth, fifth and sixth driven transmission gears n1, n2, n3, n4, n5 and n6 turnably supported on the counter gear shaft 12 via the bearing collars 13. The annular protrusion 30C on the inside peripheral surface of each driven transmission gear is formed with the engaging projections 31 engageable with the engaging pawl Rp of the swingable lever R. At both the circumferential base ends of each engaging projection 31, where the engaging surfaces 31p are erected, are formed the grooves 31v. In contrast, the modified embodiment, as shown in FIG. 26, is formed with a single groove 31v at only one circumferential end of each engaging projection 31, which is the side at which the engagement with the swingable lever R for up-shift (swingable lever Rao for normal rotation and odd-number speed or swingable lever Rae for normal rotation and even-number speed) is made.

This is the first point of difference.

This groove 31v is provided to prevent stress concentration and ensure stress dispersion at the base portion of the engaging projection 31, thus enhancing the structural strength, when the engaging pawl Rp is engaged with and pressed against the engaging surface 31p of the engaging projection 31. In this connection, the pressing force in the case of the shift-down is smaller than the pressing force in the case of the up-shift. For this reason, the groove 31v may be made shallow or dispensed with at the base portion of the engaging surface 31p at which the engagement of the swingable lever R for down-shift (swingable lever Rbo for reverse rotation and odd-number speed or swingable lever Rbe for reverse rotation and even-number speed) is made.

Machining work can be dispensed with by not forming one of the grooves 31v of the engaging projection 31.

The second point of difference relates to the sixth driven transmission gear n6 having the smallest speed reduction rate. In the embodiment described above, the coil spring (return spring) 38 is disposed between the annular protrusion 30C on the inside peripheral surface of the sixth driven transmission gear n6 and the annular plate member 35. The modified embodiment is provided, in place of the coil spring 38, with an annular waved spring 60 which is interposed and pressed under an appropriate pressure between the side wall of the annular protrusion 30C and the annular plate member 35, in such a manner that the annular plate member 35 follows the movement of the sixth driven transmission gear n6 under friction whereby a friction structure is formed.

Figure 27:
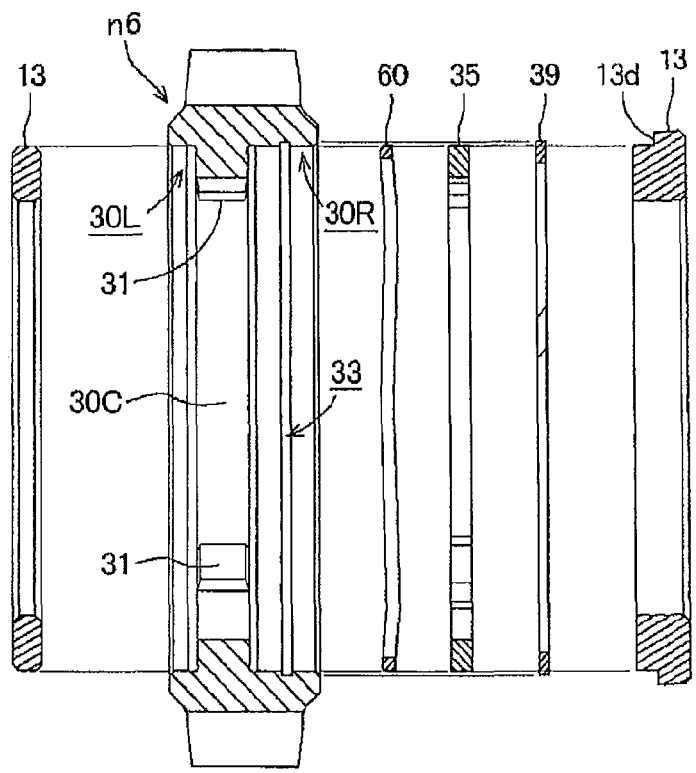
Figure 28:
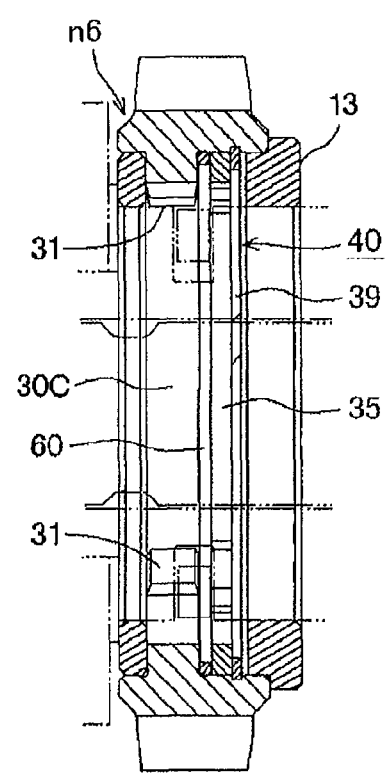
FIG. 28 is a sectional view showing the driven transmission gear, the annular plate member, the waved spring and so on in assembled state.

FIG. 27 shows an exploded view, in section, of the waved spring 60 assembled on the inside periphery of the sixth driven transmission gear n6, the annular plate member 35, the bearing collar 13 and a circlip 39. FIG. 28 shows a state in which these members are assembled.

On the inside surface of the sixth driven transmission gear n6 are formed the annular protrusion 30C between the left and right annular recesses 30l and 30R, and the inner circumferential wall of the right annular recess 30R is formed, at a predetermined axial position, with an internal circumferential groove 33 for receiving the circlip 39 therein.

The sixth driven transmission gear n6 differs, however, from the other driven transmission gears in that any arcuate groove 32 for accommodating the coil spring 38 is not formed in the side surface of the annular protrusion 30C.

Likewise, the annular plate member 35 is not formed with any circular arc-shaped cutout 37 for accommodating the coil spring 38.

Therefore, the production by machining of the sixth driven transmission gear n6 and the annular plate member 35 is facilitated.

The annular plate member 35 is identical to the annular plate member 35 in the first-described embodiment except for lacking the circular arc-shaped cutout 37.

Figure 29:
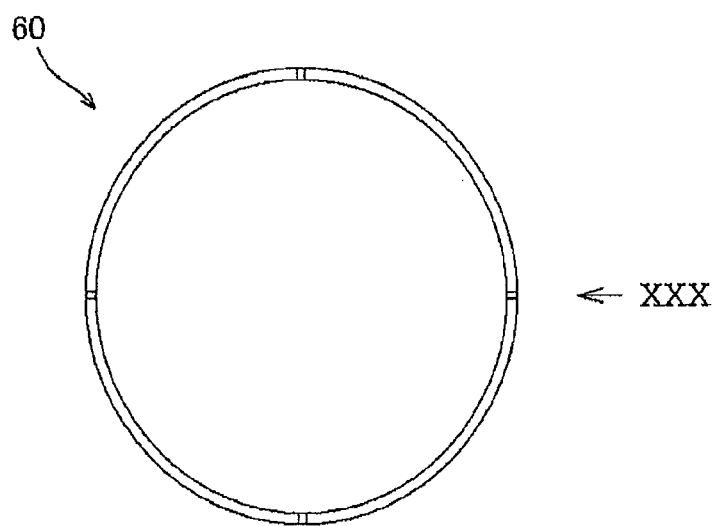
FIG. 29 is a front view of the waved spring.
Figure 30:
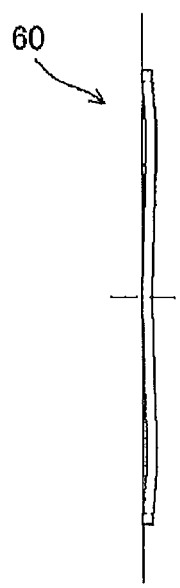
FIG. 30 is a side view of the waved spring.

As shown in FIGS. 29 and 30, the waved spring 60 is produced by preparing a wire of a flat cross-sectional shape, waving the wire along the length and shaping the wire into an annular shape to give it resiliency. The waved spring can be inserted into a narrow gap to exert an urging force.

The waved spring 60 has an outer diameter slightly smaller than the inner diameter of the right annular recess 30R of the sixth driven transmission gear n6 and is fitted in the right annular recess 30R.

In the right annular recess 30R of the sixth driven transmission gear n6 is further fitted the annular plate member 35 in overlapping relation to the waved spring 60, and the circlip 39 is additionally fitted in an inside peripheral groove 33 formed in the inside peripheral surface of the right annular recess 30R to set the annular plate member 35 in position, in such a manner that the annular plate member 35 appropriately urges the waved spring 60 against the inward protrusion 30C of the sixth driven transmission gear n6.

Accordingly, the waved spring 60 is interposed under proper pressure between the annular plate member 35 and the side surface of the inward protrusion 30C of the sixth driven transmission gear n6, whereby a friction structure is formed for making the annular plate member 35 follow the sixth driven transmission gear n6 with a predetermined friction therebetween.

Figure 31:
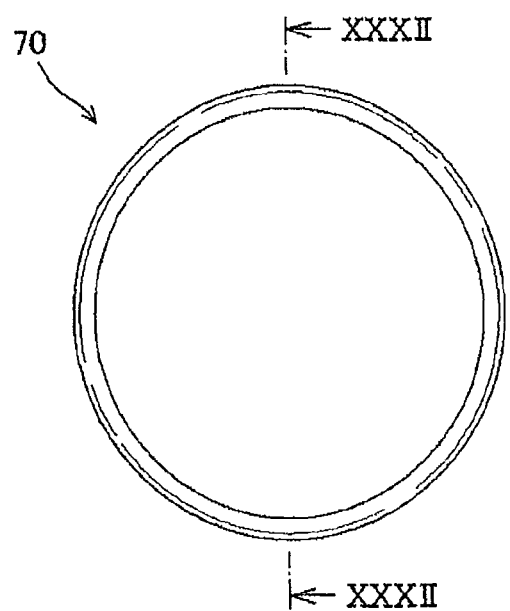
FIG. 31 is a front view of a coned disc spring.
Figure 32:
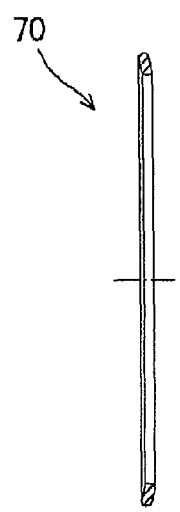
FIG. 32 is a sectional view of the cone-shaped spring.

A coned disc spring 70 as shown in FIGS. 31 and 32 may be used in place of the waved spring 60.

In the left annular recess 30L and the right annular recess 30R of the sixth driven transmission gear n6 are respectively fitted the bearing collars 13, which are interposed between the counter gear shaft 12 and the sixth driven transmission gear n6. The bearing collar 13 fitted in the right annular recess 30R, in which the friction structure is provided, has a shoulder 13d formed by annularly cutting out the circumferential outer surface of the annular plate member 35. The shoulder 13d is fitted in the internal peripheral edge of the sixth driven transmission gear n6.

Referring to FIG. 28, the bearing collars 13 fitted at the shoulder 13d in the right annular recess 30R defines a clearance 40 between the bearing collars 13 and the circlip 29 positioned axially inward of the bearing collars 13.

Because axial thrust force exerted by the sixth driven transmission gear n6 is borne by the shoulder 13d of the bearing collars 13, the distance between the bearing collars 13 and the annular protrusion 30C of the sixth driven transmission gear n6 is maintained.

For this reason, the annular plate member 35, which urges with an appropriate pressure the waved spring 60 against the annular protrusion 30C, is prevented from being further pressed by the bearing collars 13 and from exerting a thrust to the waved spring 60, so that rotation of the annular plate member 35 relative to the sixth driven transmission gear n6 is ensured. Therefore, the swingable levers R are guided with high precision and allowed to engage the engaging projections 31 of the sixth driven transmission gear n6 at proper timing.

For each of the first, second, third, fourth and fifth driven transmission gears n1, n2, n3, n4 and n5 other than the sixth driven transmission gears n6, the outside peripheral surface of the bearing collar 13 is annularly cut out on the side toward the annular plate member 35 to form the shoulder 13d, and this shoulder 13d is fitted in the inside peripheral edge of each of the first, second, third, fourth and fifth driven transmission gears n1, n2, n3, n4 and n5, so that the clearance 40 is secured between the bearing collar 13 and the circlip 39.

Therefore, even if each of the first, second, third, fourth and fifth driven transmission gears n1, n2, n3, n4 and n5 is subjected to an axial thrust, the bearing collar 13 does not press the annular plate member 35, whereby smooth rotation of the annular plate member 35 relative to each of the first, second, third, fourth and fifth driven transmission gears n1, n2, n3, n4 and n5 is ensured, and the swingable levers R are guided with high precision and allowed to engage the engaging projections 31 of each of these driven transmission gears at proper timing.

Incidentally, the first-described embodiment of the invention has the same construction described above, and, as shown in FIG. 16, a clearance 40 is defined between the bearing collar 13 and the circlip 40.

As described above, the sixth driven transmission gears n6 having the smallest speed reduction rate differs from the first, second, third, fourth and fifth driven transmission gears n1, n2, n3, n4 and n5 in that it has the friction structure including the annular waved spring 60 interposed under pressure between the annular plate member 35 and the side wall of the annular protrusion 30C, instead of the positioning structure for the annular plate member 35, using the coil springs 38, whereby the annular plate member 35 is caused to follow the movement of the sixth driven transmission gears n6 with a predetermined friction.

Figure 33:
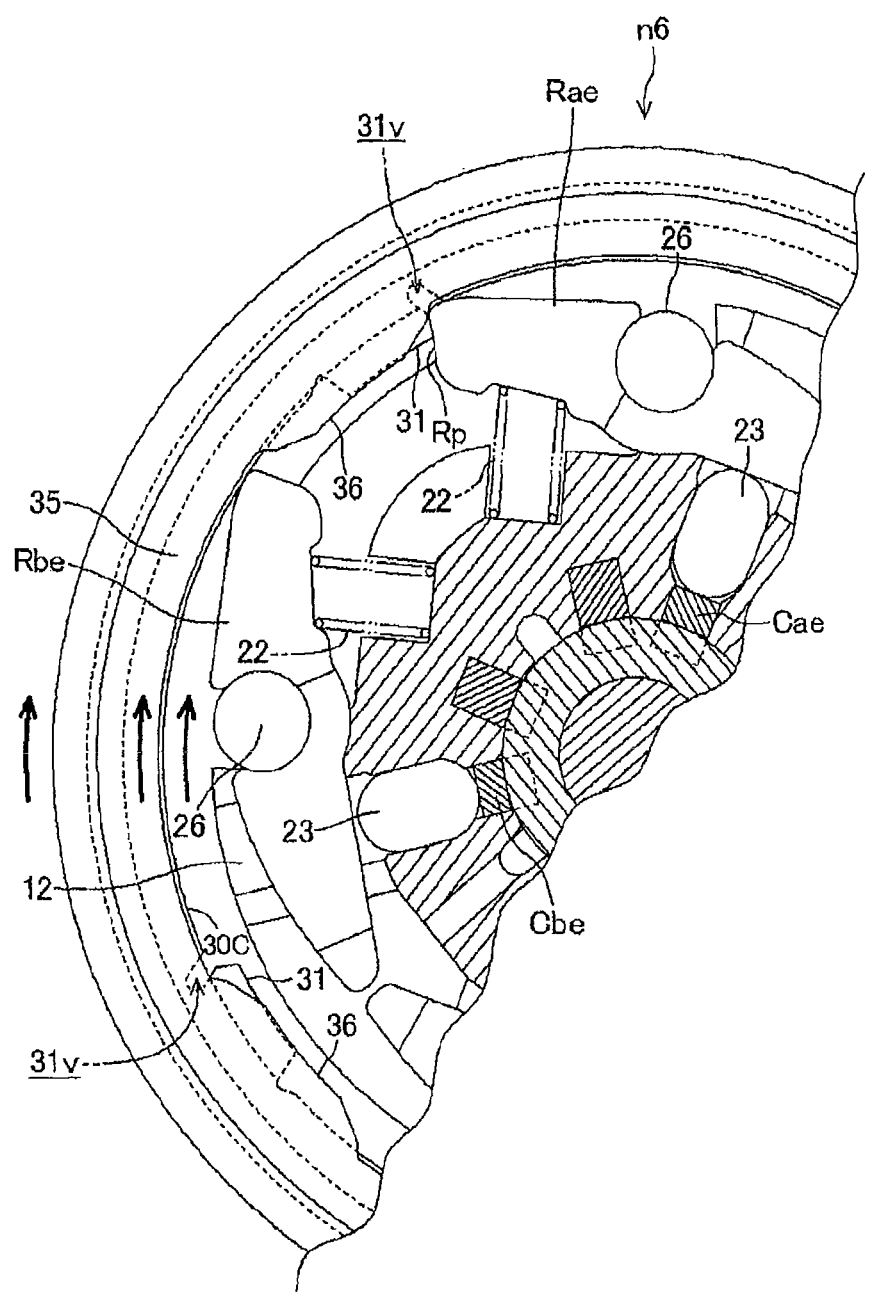
FIG. 33 shows an enlarged view in which a sixth speed is established for a sixth driven gear, swingable lever and an annular plate member.

In the state in which the sixth speed of the smallest reduction rate is established, the engaging projections 31 of the sixth driven transmission gears n6 is, as shown in FIG. 33, engaging the protruding engaging pawls Rp of the swingable levers Rae for normal rotation and even-number speed, and power is being transmitted therethrough, while the annular plate member 35 is displaced in the direction of reverse rotation relative to the engaging projections 31 with its abutment projections 36 being pressed by the swingable levers Rae.

Figure 34:
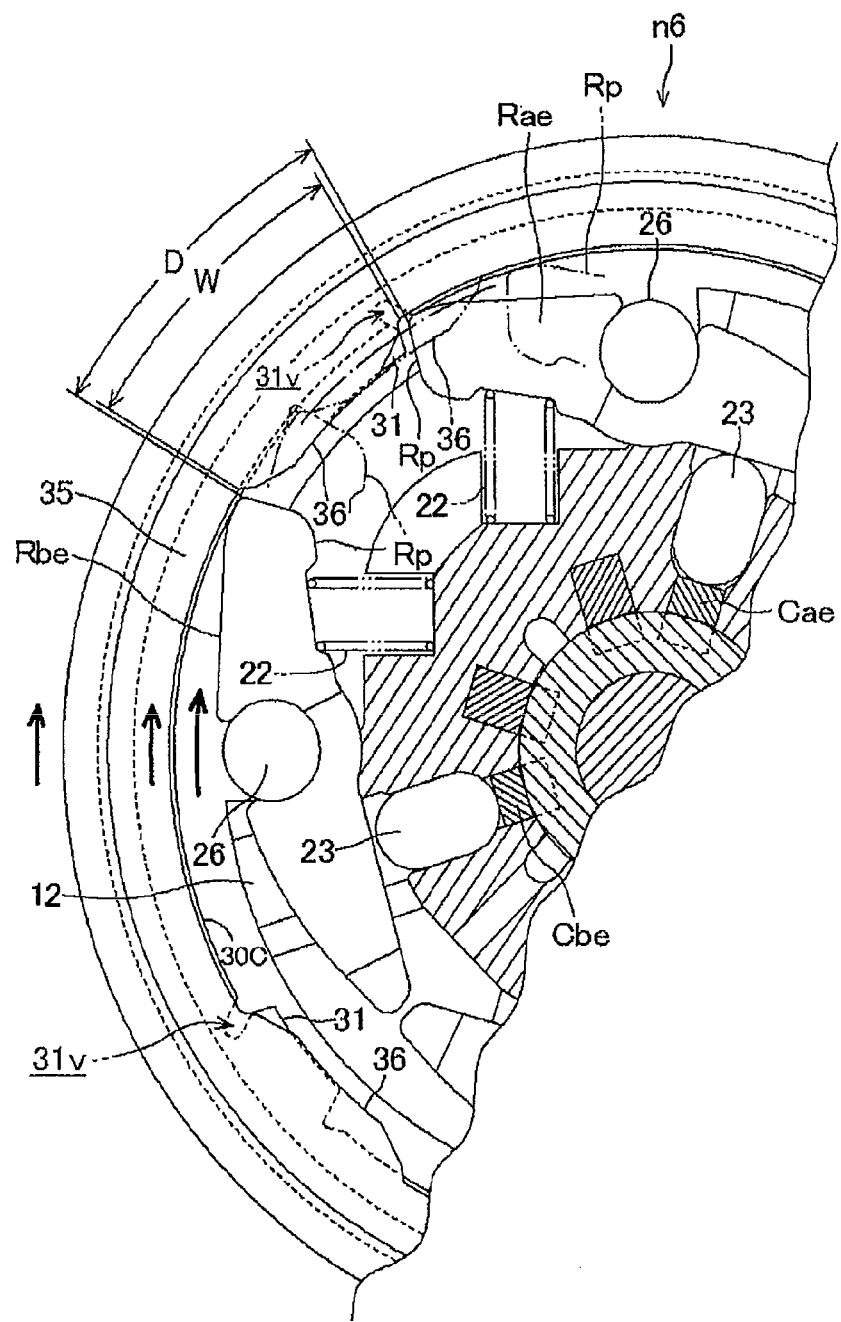
FIG. 34 shows an enlarged view in which an engaging pawl of a swingable lever for normal rotation and even-number is separated from an abutment projection of a sixth driven transmission gear as a result of speed reduction.

As shown in FIG. 34, the width W of the abutment projections 36 of the annular plate member 35 in the peripheral direction is smaller than the spacing D in the peripheral direction between the protruding engaging pawl Rp of the swingable levers Rae for normal rotation and even-number speed for shift up and the protruding engaging pawl Rp of the swingable levers Rbe for reverse rotation and even-number speed for shift down. Therefore, the abutment projections 36 of the annular plate member 35 are positioned between the swingable levers Rae and Rbe and are ready for both the shift up and the shift down operations.

If the down-shift operation is done for speed reduction in the state shown in FIG. 33 in which the sixth speed is established, the rotational speed of the sixth driven transmission gears n6 is made lower than the rotational speed of the swingable levers Rae for normal rotation and even-number speed and the swingable levers Rbe for reverse rotation and even-number speed, which are rotating with the counter gear shaft 12. Therefore, as shown in FIG. 34, the swingable levers Rae for normal rotation and even-number speed move away from the associated engaging projections 31. At this time, the abutment projections 36 of the annular plate member 35 do not change their positions relative to the associated engaging projections 31 and follow the movements of the associated engaging projections 31 due to the function of the waved spring 60. In other words, the abutment projections 36 stay at positions displaced relative to the associated engaging projections 31 in the direction of reverse rotation. Meanwhile the protruding engaging pawls Rp of the swingable levers Rbe for reverse rotation and even-number speed approach the associated engaging projections 31 (see the two-dot chain line in FIG. 34).

As a consequence, the protruding engaging pawls Rp of the swingable levers Rbe for reverse rotation and even-number speed first abut the abutment projections 36 of the annular plate member 35, which are displaced relative to the associated engaging projections 31 in the direction of reverse rotation. The protruding engaging pawls Rp, while moving the abutment projections 36 in the direction of normal rotation, then positively engage the associated engaging projections 31 of the sixth driven transmission gears n6.

Thus, it is not necessary to move the abutment projections 36 of the annular plate member 35 by any return spring, etc. so as to fully overlap the respective engaging projections 31 with their centers coincided, when the engaging pawls Rp of the swingable levers Rae for normal rotation and even-number speed move away from the associated engaging projections 31.

In the speed below the sixth speed in which up-shift operation is possible, shift-up operation is sometimes done for speed increase in a state in which the swingable levers Ra for normal rotation are separated from the associated engaging projections 31 (see FIG. 33) for speed reduction. In this case, if the annular plate member 35 remains displaced in the direction of reverse rotation, the engaging pawls Rp of the swingable levers Ra for normal rotation collide directly against the engaging projections 31 without preliminarily abutting the abutment projections 36 of the annular plate member 35. This causes excessive partial load on the engaging pawls Rp imposed by the engaging projections 31.

To prevent this, the abutment projections 36 of the annular plate member 35 for each of the first, second, third, fourth and fifth driven transmission gears n1, n2, n3, n4 and n5 are constantly urged by the coil springs 38 such that the abutment projections 36 overlap the associated engaging projections 31 with their centers coincided.

On the other hand, the sixth driven transmission gears n6, which is not subjected to shift-up operation for speed increase, employs the friction structure for making the abutment projections 36 of the annular plate member 35 follow the associated engaging projections 31 by the use of the waved spring 60.

Only for the sixth driven transmission gears n6 having the smallest speed reduction ratio, the urging or positioning structure for the annular plate member 35 using the coil springs 38 is not employed, but the simplified friction structure including the annular waved spring 60 interposed under proper pressure between the annular plate member 35 and the side wall of the inward protrusion 30C. This simplifies the construction as well as the machining and assembling works and serves to reduce the total costs.

The friction structure may be employed, if necessary, for the first driven transmission gears n1 having the largest speed reduction rate since down-shift operation is not done when the first speed is established.

The invention claimed is:

1. A multistage transmission in which a plurality of driving gears (m) and a plurality of driven gears (n) are supported on mutually parallel gear shafts in a constantly meshing state for every speed, one of the driving gears (m) and the driven gears (n) are fixed to one of the gear shaft, and engagement means is provided for each of the other gears, the engagement means being operative to cause an engaging projection (31) formed on an inside periphery of each of the other gears to engage a radially movable engaging member (R) provided on the other gear shaft (12) for each of the other gears, due to radially outward protrusion of the engaging member (R), in a manner to fix each of the other gears to the other gear shaft for speed shift:
wherein said engaging projection (31) is formed on an annular inward protrusion (30C) on the inside periphery of each of the other gears (n);
an annular plate member (35) is provided which is positioned close to, and turnably relative to a side surface of the inward protrusion (30C) having the engaging projection (31) of each of the other gears (n); and
a return spring (38) is interposed between each of the other gears (n) and the annular plate member (35) to elastically maintain a predetermined relative position thereof; and
wherein the annular plate member (35) is provided on an inside periphery thereof with an abutment projection (36) having inclined surfaces for abutment with the engaging member (R), said return spring (38) being operative to cause a portion of the abutment projection (36) at least other than the inclined surfaces to overlap the engaging projection (31) as viewed in an axial direction; and
each of the inclined surfaces of the abutment projection (36) comprises a bottom-side inclined surface (36pb) having an inclination angle allowing engagement with the engaging member (R), and a top-side inclined surface (36ps) having an inclination angle which does not allow engagement with the engaging member (R) but allows sliding movement of the engaging member (R).

2. The multistage transmission according to claim 1, wherein:
the abutment projection (36) of the annular plate member (35) has a circumferential width smaller than a circumferential spacing between the engaging pawl (Rp), in a protruding position, of the engaging member (Ra) for up-shift and the engaging pawl (Rp), in a protruding position, of the engaging member (Rb) for down-shift.

3. The multistage transmission according to claim 1, wherein:
each of the other gears (n) is fitted turnably on adjoining bearing collars (13) fitted on the other gear shaft (12); and
each of the bearing collars (13) has a circumferential shoulder (13d) formed by annularly cutting out an outside peripheral edge thereof facing the associated annular plate member (35), and the circumferential shoulder (13d) is fitted in an inner peripheral edge of each of the other gears (n) to support the same.

4. The multistage transmission according to claim 1, wherein a groove (31v) is formed at least in a base portion at one of two circumferential ends of the abutment projection (36), on a side at which the engaging member (Ra) for up-shift abuts.

5. The multistage transmission according to claim 4, wherein:
the abutment projection (36) of the annular plate member (35) has a circumferential width smaller than a circumferential spacing between the engaging pawl (Rp), in a protruding position, of the engaging member (Ra) for up-shift and the engaging pawl (Rp), in a protruding position, of the engaging member (Rb) for down-shift.

6. The multistage transmission according to claim 4, wherein:
each of the other gears (n) is fitted turnably on adjoining bearing collars (13) fitted on the other gear shaft (12); and
each of the bearing collars (13) has a circumferential shoulder (13d) formed by annularly cutting out an outside peripheral edge thereof facing the associated annular plate member (35), and the circumferential shoulder (13d) is fitted in an inner peripheral edge of each of the other gears (n) to support the same.

7. The multistage transmission according to claim 1, wherein an arcuate groove (32) is provided in a circumferential direction in a side surface of the inward protrusion (30C) with the engaging projection (31), of each of the other gears (n); and
a circular arc-shaped cutout (37) in axial opposition to the arcuate groove (32) is formed on a surface of the annular plate member (35), axially opposing the inward protrusion (30C); and
wherein the return spring (38) is inserted between the arcuate groove (32) and the circular arc-shaped cutout (37); and
a clip (39) is fitted at a side of the annular plate member (35) opposite the side at which the annular plate member (35) faces the inward protrusion (30C) to prevent the annular plate member (35) from moving axially.

8. The multistage transmission according to claim 7, wherein:
the abutment projection (36) of the annular plate member (35) has a circumferential width smaller than a circumferential spacing between the engaging pawl (Rp), in a protruding position, of the engaging member (Ra) for up-shift and the engaging pawl (Rp), in a protruding position, of the engaging member (Rb) for down-shift.

9. The multistage transmission according to claim 7, wherein:
each of the other gears (n) is fitted turnably on adjoining bearing collars (13) fitted on the other gear shaft (12); and
each of the bearing collars (13) has a circumferential shoulder (13d) formed by annularly cutting out an outside peripheral edge thereof facing the associated annular plate member (35), and the circumferential shoulder (13d) is fitted in an inner peripheral edge of each of the other gears (n) to support the same.

10. The multistage transmission according to claim 1, wherein:
at least one (n6) of the other gears (n) having the smallest speed reduction rate among all the other gears (n) is provided with a friction structure for causing the annular plate member (35) to follow the movement of the one (n6) of the other gears under a predetermined friction, the friction structure being interposed between the annular plate member (35) and one (n6) of the other gears (n), in place of the return spring (38).

11. The multistage transmission according to claim 10, wherein the friction structure includes an annular waved spring (60) interposed between the annular plate member (35) and a side surface of the inward protrusion (30C) of the one (n6) of the other gears.

12. The multistage transmission according to claim 10, wherein the friction structure includes a coned disc spring (70) interposed between the annular plate member (35) and a side surface of the inward protrusion (30C) of the one (n6) of the other gears.

13. The multistage transmission according to claim 1, wherein:
   the engaging member (R) is swingable relative to the other gear shaft to cause an engaging pawl (Rp) thereof to radially outwardly protrude and radially inwardly retreat; and
   an angle (θ) between the bottom-side inclined surface (36pb) and a straight line linking a contact point (Q), at which a tip end of the engaging pawl (Rp) contacts the bottom-side inclined surface (36pb) of the abutment projection (36), and a center (P) of swing of the engaging member (R), is set to an obtuse angle close to the right angle.

14. The multistage transmission according to claim 13, wherein a groove (31v) is formed at least in a base portion at one of two circumferential ends of the abutment projection (36), on a side at which the engaging member (Ra) for up-shift abuts.

15. The multistage transmission according to claim 13, wherein:
   the abutment projection (36) of the annular plate member (35) has a circumferential width smaller than a circumferential spacing between the engaging pawl (Rp), in a protruding position, of the engaging member (Ra) for up-shift and the engaging pawl (Rp), in a protruding position, of the engaging member (Rb) for down-shift.

16. The multistage transmission according to claim 13, wherein:
   each of the other gears (n) is fitted turnably on adjoining bearing collars (13) fitted on the other gear shaft (12); and
   each of the bearing collars (13) has a circumferential shoulder (13d) formed by annularly cutting out an outside peripheral edge thereof facing the associated annular plate member (35), and the circumferential shoulder (13d) is fitted in an inner peripheral edge of each of the other gears (n) to support the same.

17. The multistage transmission according to claim 13, wherein the angle (θ) between the straight line (PQ) and the bottom-side inclined surface (36pb) is between 90 and 100 degrees.

18. The multistage transmission according to claim 17, wherein a groove (31v) is formed at least in a base portion at one of two circumferential ends of the abutment projection (36), on a side at which the engaging member (Ra) for up-shift abuts.

19. The multistage transmission according to claim 17, wherein:
   the abutment projection (36) of the annular plate member (35) has a circumferential width smaller than a circumferential spacing between the engaging pawl (Rp), in a protruding position, of the engaging member (Ra) for up-shift and the engaging pawl (Rp), in a protruding position, of the engaging member (Rb) for down-shift.

20. The multistage transmission according to claim 17, wherein:
   each of the other gears (n) is fitted turnably on adjoining bearing collars (13) fitted on the other gear shaft (12); and
   each of the bearing collars (13) has a circumferential shoulder (13d) formed by annularly cutting out an outside peripheral edge thereof facing the associated annular plate member (35), and the circumferential shoulder (13d) is fitted in an inner peripheral edge of each of the other gears (n) to support the same.

* * * * *